US008224081B2

(12) United States Patent
Tani et al.

(10) Patent No.: US 8,224,081 B2
(45) Date of Patent: Jul. 17, 2012

(54) IMAGE PROCESSOR

(75) Inventors: Yujiro Tani, Osaka (JP); Atsushi Uchiyama, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 769 days.

(21) Appl. No.: 12/400,997

(22) Filed: Mar. 10, 2009

(65) Prior Publication Data

US 2009/0232393 A1 Sep. 17, 2009

(30) Foreign Application Priority Data

Mar. 12, 2008 (JP) ................. 2008-061989

(51) Int. Cl.
*G06K 9/00* (2006.01)
*G06K 9/36* (2006.01)
*G06K 9/46* (2006.01)

(52) U.S. Cl. ......... 382/166; 382/233; 382/248; 382/250

(58) Field of Classification Search .................. 382/166, 382/233, 248, 250
See application file for complete search history.

(56) References Cited

U.S. PATENT DOCUMENTS

| 5,113,243 | A * | 5/1992 | Fautier .......................... 348/469 |
| 5,642,460 | A * | 6/1997 | Shimoda ....................... 386/205 |
| 7,379,609 | B2 * | 5/2008 | Park et al. ..................... 382/248 |
| 2001/0019630 | A1 * | 9/2001 | Johnson ........................ 382/232 |
| 2003/0197784 | A1 * | 10/2003 | Bae .............................. 348/207.1 |
| 2004/0247034 | A1 * | 12/2004 | Zhong et al. .............. 375/240.29 |
| 2005/0226324 | A1 * | 10/2005 | Ouyang et al. ........... 375/240.12 |
| 2007/0104377 | A1 * | 5/2007 | Fukui ............................. 382/232 |
| 2008/0056389 | A1 * | 3/2008 | Chiang et al. ............ 375/240.29 |
| 2008/0247653 | A1 * | 10/2008 | Moussavi et al. ............. 382/232 |

OTHER PUBLICATIONS

U.S. Appl. No. 12/401,132, filed Mar. 10, 2009, Tani, et al.
U.S. Appl. No. 12/403,041, filed Mar. 12, 2009, Uchiyama, et al.
U.S. Appl. No. 12/402,817, filed Mar. 12, 2009, Uchiyama, et al.
"HD Photo—Photographic Still Image File Format", Nov. 7, 2006, pp. 140.
"Coding of Still Pictures—JBIG JPEG", ISO/IEC JTC 1/SC 29/WG 1 N 4392, ISO/IEC CD 29199-2, Dec. 19, 2007, pp. 151.

* cited by examiner

*Primary Examiner* — Yubin Hung
(74) *Attorney, Agent, or Firm* — Oblon, Spivak, McClelland, Maier & Neustadt, L.L.P.

(57) ABSTRACT

In a first input step from outside to an image processor, a signal input unit inputs to a pre-filter a first part of first luminance signals inputted from outside, which is a part to be processed by the pre-filter in the first input step, and stores a remaining second part of the first luminance signals in the memory unit. In a second input step following the first input step, the signal input unit inputs to the pre-filter the second part of the first luminance signals read from the memory unit and a first part of second luminance signals inputted from outside, which is a part to be processed by the pre-filter in the second input step, and stores a remaining second part of the second luminance signals in the memory unit.

4 Claims, 36 Drawing Sheets

R11 R12 R13

M8 M11
M6 M10

R22
R21 R23

N4 N5

IMAGE PROCESSOR

CROSS-REFERENCE TO RELATED APPLICATIONS

This application claims priority to Japanese Patent Application No. 2008-061989. The entire disclosure of Japanese Patent Application No. 2008-061989 is hereby incorporated herein by reference.

BACKGROUND OF THE INVENTION

1. Field of the Invention

The present invention generally relates to an image processor, and more particularly, to an encoder and a decoder for HD Photo.

2. Description of the Background Art

Microsoft Corporation proposes HD Photo (or JPEG XR) as a still image file format that offers higher image quality than JPEG while requiring more simple circuit configuration and computation than JPEG 2000.

An encoder for HD Photo includes a frequency transform unit performing predetermined frequency transform (PCT), and a pre-filter performing predetermined prefiltering so as to reduce block artifacts. The frequency transform unit performs a frequency transform with a pixel block having 4 pixels in column×4 pixels in row as a unit region for processing. The pre-filter performs prefiltering with a region which overlaps with plural unit regions for processing by the frequency transform unit as a unit region for processing, before frequency transform is performed.

A decoder for HD Photo includes a frequency inverse transform unit performing frequency inverse transform that corresponds to the above frequency transform, and a post-filter performing postfiltering that corresponds to the above prefiltering. The frequency inverse transform unit performs frequency inverse transform with a pixel block having 4 pixels in column×4 pixels in row as a unit region for processing. The post-filter performs postfiltering with a region which overlaps with plural unit regions for processing by the frequency inverse transform unit as a unit region for processing, after frequency inverse transform is performed.

HD Photo provides supports for images represented by RGB color space. In addition, HD Photo supports images represented by YUV color space. For processing an image of YUV color space, the encoder for HD Photo includes a luminance signal processing unit for processing a luminance signal (Y signal), and a chrominance signal processing unit for processing a chrominance signal (U and V signals). The luminance signal processing unit and the chrominance signal processing unit each includes the above pre-filter and frequency transform unit. Alternatively, the luminance signal processing unit and the chrominance signal processing unit share one pre-filter and one frequency transform unit. Similarly, for processing an image of YUV color space, the decoder for HD Photo includes a luminance signal processing unit for processing a luminance signal, and a chrominance signal processing unit for processing a chrominance signal. The luminance signal processing unit and the chrominance signal processing unit each includes the above post-filter and frequency inverse transform unit. Alternatively, the luminance signal processing unit and the chrominance signal processing unit share one post-filter and one frequency inverse transform unit.

The details of HD Photo are disclosed in, for example, "HD Photo—Photographic Still Image File Format", [online], 7 Nov. 2006, Microsoft Corporation, [searched in the Internet on 10 Oct. 2007], <URL: http://www.microsoft.com/whdc/xps/hdphotodpk.mspx>. The details of JPEG XR are disclosed in, for example, "Coding of Still Pictures -JBIG JPEG", [online], 19 Dec. 2007, ISO/IEC JTC 1/SC 29/WG1 N 4392, [searched in the Internet on 4 Mar. 2008], <URL: http://www.itscj.ipsj.or.jp/sc29/open/29view/29n9026t.doc>.

In an image of YUV444 format, a pixel plane has the same number of Y, U, and V signals within one row. Thus the luminance signal processing unit and the chrominance signal processing unit in the encoder and the decoder for HD Photo can process each of the Y, U, and V signals with respect to a pixel in the same position within the pixel plane.

In contrast, in an image of YUV422 Format, a pixel plane has half number of U and V signals each of the number of Y signals within one row. Thus in the encoder and the decoder for HD Photo, some measures need to be taken to prevent difference in the position within a pixel plane between a pixel processed by the luminance signal processing unit and a pixel processed by the chrominance signal processing unit.

SUMMARY OF THE INVENTION

It is an object of the present invention to provide an image processor that prevents difference in the position within a pixel plane between a pixel processed by a luminance signal processing unit and a pixel processed by the chrominance signal processing unit, with respect to an image processor that processes an image in which there are a smaller number of chrominance signals than luminance signals within a row of a pixel plane.

According to a first aspect of the present invention, an image processor comprises a luminance signal processing unit processing a luminance signal; and a chrominance signal processing unit processing a chrominance signal. The image processor processes an image in which there are a smaller number of chrominance signals than luminance signals within a row of a pixel plane. The luminance signal processing unit includes a frequency transform unit performing frequency transform, a pre-filter performing prefiltering with a region which overlaps with plural unit regions for processing by the frequency transform unit as a unit region for processing, before frequency transform is performed, and a signal input unit receiving input of a luminance signal from outside the luminance signal processing unit and inputting a luminance signal to be processed by the pre-filter to the pre-filter. The signal input unit includes a memory unit. In a first input step from outside to the image processor, the signal input unit inputs to the pre-filter a first part of first luminance signals inputted from outside, which is a part to be processed by the pre-filter in the first input step, while storing a remaining second part of the first luminance signals in the memory unit, and in a second input step following the first input step, the signal input unit inputs to the pre-filter the second part of the first luminance signals read from the memory unit and a first part of second luminance signals inputted from outside, which is a part to be processed by the pre-filter in the second input step, while storing a remaining second part of the second luminance signals in the memory unit.

Preferably, in the image processor, a luminance signal and a chrominance signal corresponding to an identical pixel are respectively inputted to the luminance signal processing unit and the chrominance signal processing unit in each input step.

According to a second aspect of the present invention, an image processor includes a luminance signal processing unit processing a luminance signal, and a chrominance signal processing unit processing a chrominance signal. The image processor processes an image in which there are a smaller number of chrominance signals than luminance signals within a row of a pixel plane. The luminance signal processing unit includes a frequency inverse transform unit performing frequency inverse transform, a post-filter performing postfiltering with a region which overlaps with plural unit regions for processing by the frequency inverse transform unit as a unit region for processing, after frequency inverse transform is performed, and a signal output unit receiving input of a luminance signal processed by the post-filter from the post-filter and outputting a luminance signal to outside the luminance signal processing unit. The signal output unit includes a memory unit. In a first output step from the image processor to outside, the signal output unit outputs a first part of first luminance signals inputted from the post-filter, which is a part to be outputted to outside in the first output step, while storing a remaining second part of the first luminance signals in the memory unit, and in a second output step following the first output step, the signal output unit outputs the second part of the first luminance signals read from the memory unit and a first part of second luminance signals inputted from the post-filter, which is a part to be outputted to outside in the second output step, while storing a remaining second part of the second luminance signals in the memory unit.

Preferably, a luminance signal and a chrominance signal corresponding to an identical pixel are respectively outputted from the luminance signal processing unit and the chrominance signal processing unit in each output step.

Thus difference in the position within a pixel plane between a pixel processed by the luminance signal processing unit and a pixel processed by the chrominance signal processing unit can be prevented.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
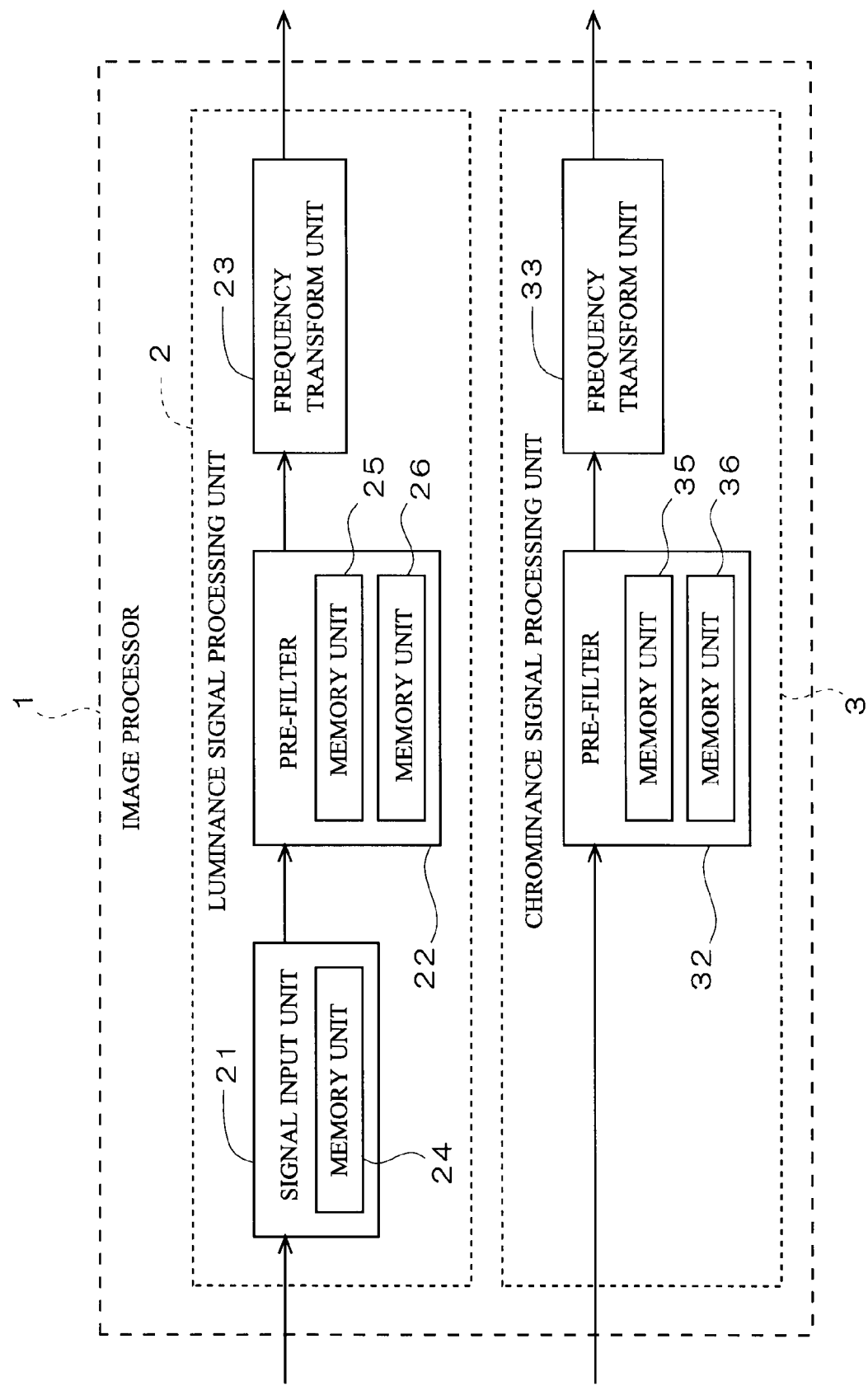
FIG. 1 is a block diagram showing a configuration of an image processor according to a first preferred embodiment of the present invention.

Preferred embodiments of the present invention are described in detail below referring to the drawings. It should be noted that identical reference numerals throughout the drawings indicate identical or equivalent elements.

An example of applying an image processor according to the present invention to an encoder (specifically a frequency transformer) for HD Photo is described in the following first preferred embodiment. Furthermore, an example of applying an image processor according to the present invention to a decoder (specifically a frequency inverse transformer) for HD Photo is described in the following second preferred embodiment.

<First Preferred Embodiment>

FIG. 1 is a block diagram showing a configuration of an image processor 1 according to a first preferred embodiment of the present invention. The image processor 1 includes a luminance signal processing unit 2 and a chrominance signal processing unit 3. The image processor 1 is capable of processing an image in which there are a smaller number of chrominance signals than luminance signals within a row of a pixel plane. In the following example, the luminance signal processing unit 2 processes a Y signal in YUV422 format, and the chrominance signal processing unit 3 processes U and V signals in YUV422 format.

The luminance signal processing unit 2 includes a signal input unit 21, a pre-filter 22, and a frequency transform unit 23. The signal input unit 21 has a memory unit 24, and the pre-filter 22 has memory units 25 and 26. The memory unit 26 is a line memory with capacity in accordance with the length of a row in a pixel plane. In contrast, capacity of each of the memory units 24 and 25 is independent of the length of a row in a pixel plane.

The chrominance signal processing unit 3 includes a pre-filter 32 and a frequency transform unit 33. The pre-filter 32 has memory units 35 and 36. The memory unit 36 is a line memory with capacity in accordance with the length of a row in a pixel plane. In contrast, capacity of the memory unit 35 is independent of the length of a row in a pixel plane.

FIG. 1 shows an example of the luminance signal processing unit 2 and the chrominance signal processing unit 3 respectively including the pre-filters 22 and 32, but the luminance signal processing unit 2 and the chrominance signal processing unit 3 may share one pre-filter. Similarly, FIG. 1 shows an example of the luminance signal processing unit 2 and the chrominance signal processing unit 3 respectively including the frequency transform units 23 and 33, but the luminance signal processing unit 2 and the chrominance signal processing unit 3 may share one frequency transform unit.

Figure 2:
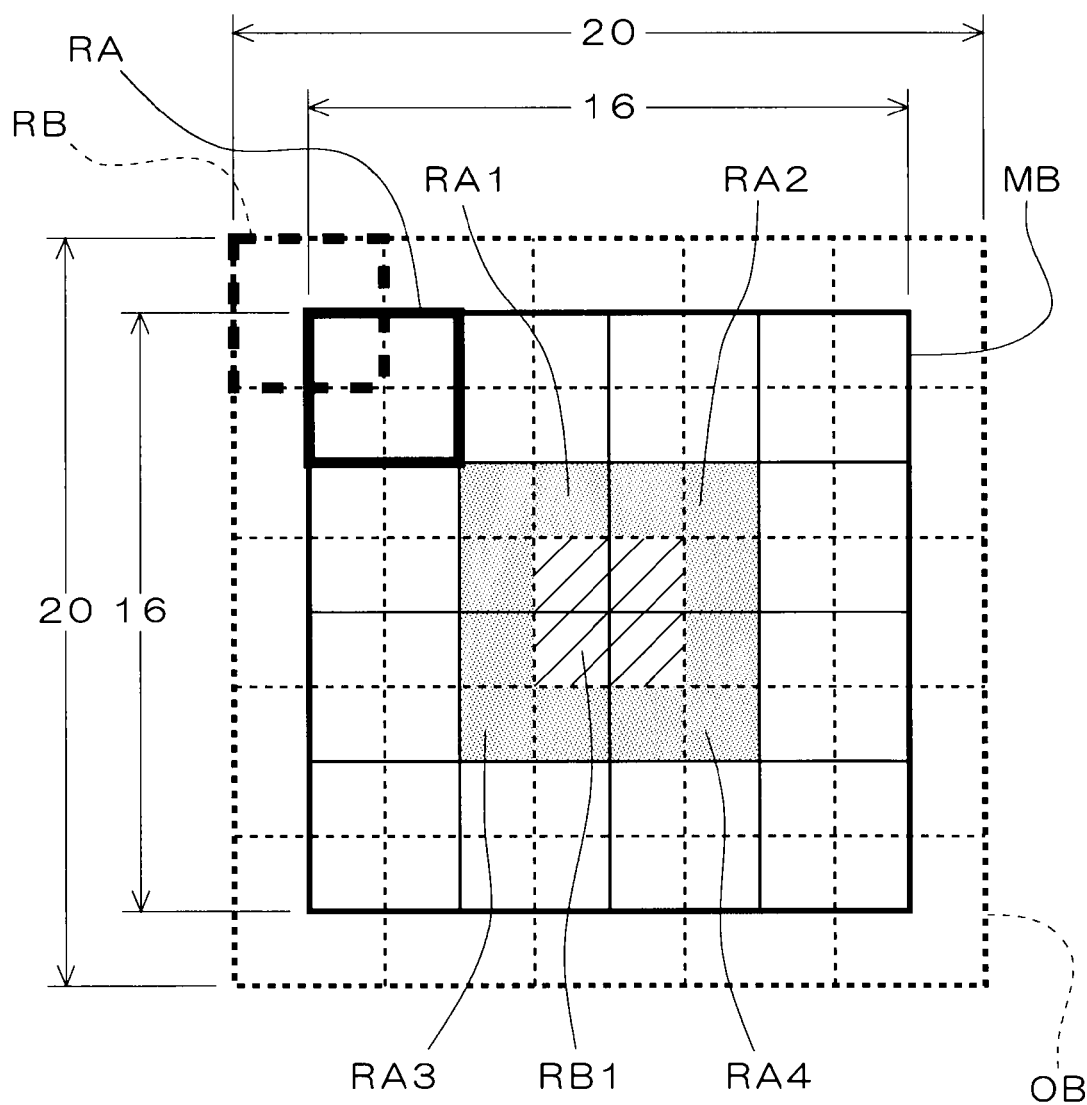
FIG. 2 is a diagram showing a macroblock within a pixel plane.

FIG. 2 is a diagram showing a macroblock MB within a pixel plane. The macroblock MB consists of a total of 256 pixels of 16 pixels in column×16 pixels in row. A total of 16 pixel blocks RA of 4 in column×4 in row are defined within the macroblock MB. Each pixel block RA consists of a total of 16 pixels of 4 pixels in column×4 pixels in row. The frequency transform units 23 and 33 perform predetermined frequency transform (PCT: HD Photo Core Transform) with each pixel block RA as a unit region for processing. In YUV422 format, one unit region for processing (pixel block RA) of the frequency transform units 23 and 33 has 16 of Y signals (4 in column×4 in row) and 8 each of U and V signals (4 in column×2 in row).

Furthermore, a pixel block OB having 20 pixels in column×20 pixels in row, being 2 pixels each larger to the left, right, top and bottom than the macroblock MB, is defined. A total of 25 pixel blocks RB of 5 in column×5 in row are defined within the pixel block OB. Each pixel block RB consists of a total of 16 pixels of 4 pixels in column×4 pixels in row. The pre-filters 22 and 32 perform predetermined prefiltering with each pixel block RB as a unit region for processing. However, at an edge of a pixel plane, a unit region for processing having 4 pixels in column×4 pixels in row is not secured, but a pixel block having 4 pixels in column×2 pixels in row, 2 pixels in column×4 pixels in row, or 2 pixels in column×2 pixels in row serves as a unit region for processing of the pre-filters 22 and 32. Similar to the above, in YUV422 format, one unit region for processing (pixel block RB) of the pre-filters 22 and 32 has 16 of Y signals and 8 each of U and V signals.

As shown in FIG. 2, a pixel block RB1 (indicated by oblique lines), which is a unit region for processing of the pre-filters 22 and 32, overlaps with 4 pixel blocks RA1 to RA4 (indicated by a sanded pattern), which are unit regions for processing of the frequency transform units 23 and 33. Thus the pre-filters 22 and 32 perform prefiltering with a region which overlaps with plural unit regions for processing by the frequency transform units 23 and 33 as a unit region for processing. Consequently, block artifacts are reduced.

FIGS. 3A to 19A are diagrams illustrating how the image processor 1 operates, in relation to the operation of the luminance signal processing unit 2, and FIGS. 3B to 19B are diagrams illustrating how the image processor 1 operates, in relation to the operation of the chrominance signal processing unit 3. In each figure, to simplify the description, pixel blocks corresponding to the macroblocks MB positioned at the left end, center, and right end of a pixel plane are extracted and respectively shown as pixel blocks R11 or R21, R12 or R22, and R13 or R23.

Furthermore, to clearly illustrate, in FIGS. 3A to 19B, the regions whose luminance or chrominance signals have been inputted from a preceding external device (for example, an imaging element) to the luminance signal processing unit 2 or the chrominance signal processing unit 3 are indicated by zigzag lines. Similarly, the regions whose luminance signals have been transmitted from the signal input unit 21 to the pre-filter 22 are indicated by oblique lines. Similarly, the regions whose luminance signals have been stored in the memory unit 24 are indicated by lateral stripes. Similarly, the regions where prefiltering by the pre-filter 22 or 32 has been completed are indicated by a sanded pattern. Similarly, the regions whose luminance or chrominance signals have been stored in the memory unit 25 or 35 are indicated by a netted pattern.

Figure 3A:
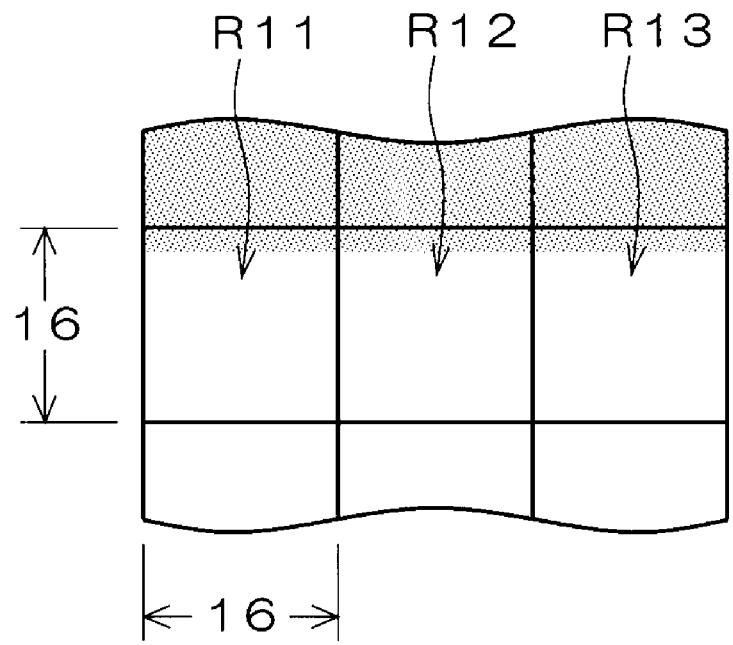
FIGS. 3A and 3B are diagrams illustrating how the image processor operates.
Figure 3B:
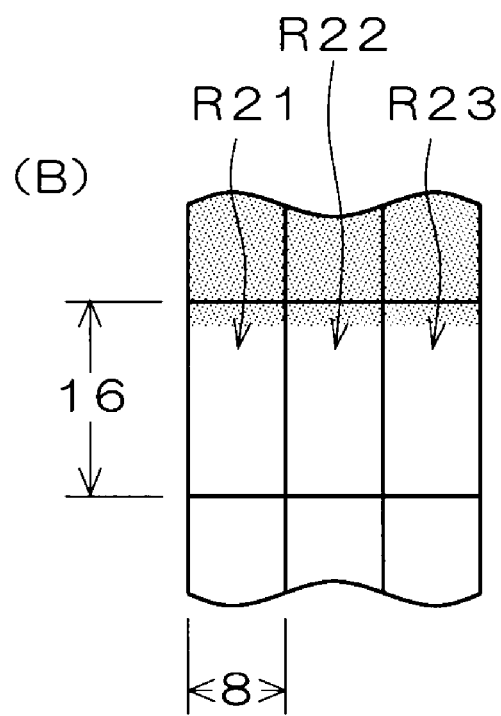

Referring to FIG. 3A, prefiltering by the pre-filter 22 of the top 2 rows within each of the pixel blocks R11 to R13 has been completed at this time. The luminance signals after prefiltering of this region have been stored in the memory unit 26. Referring to FIG. 3B, prefiltering by the pre-filter 32 of the top 2 rows within each of the pixel blocks R21 to R23 has been completed at this time. The chrominance signals after prefiltering of this region have been stored in the memory unit 36.

<First Input Step to Image Processor 1>

Figure 4A:
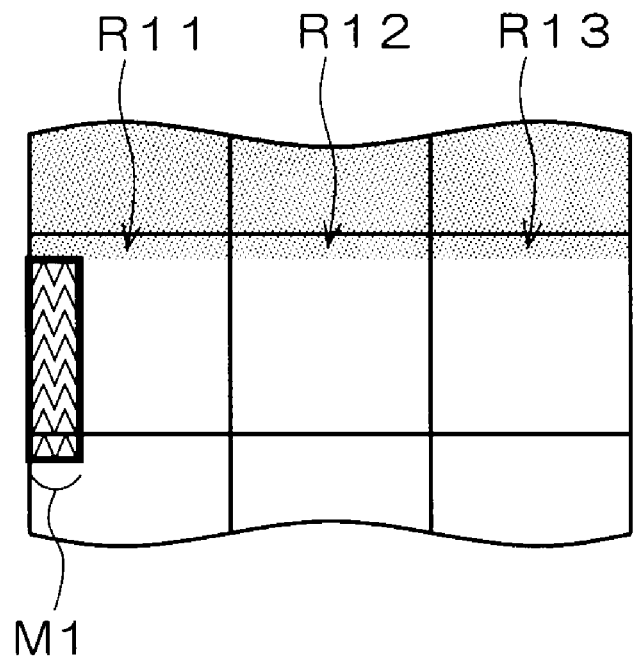
FIGS. 4A and 4B are diagrams illustrating how the image processor operates.
Figure 4B:
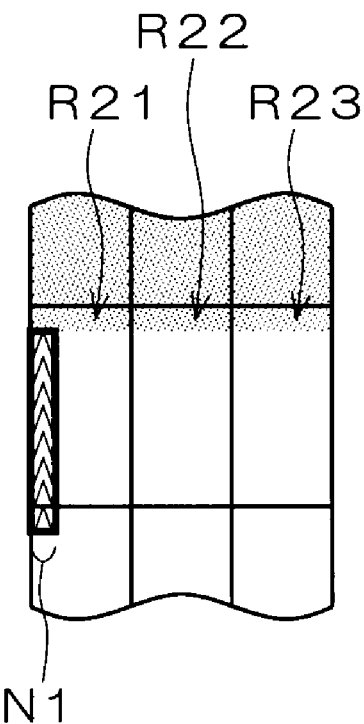

Referring now to FIG. 4A, 16 in column×4 in row luminance signals (region M1) that are equivalent to a pixel block having 16 pixels in column×4 pixels in row are inputted from an external device preceding the image processor 1 to the signal input unit 21 of the luminance signal processing unit 2. Referring to FIG. 4B, 16 in column×2 in row chrominance signals (region N1) that are equivalent to the identical pixel block (16 pixels in column×4 pixels in row) whose luminance signals are inputted to the luminance signal processing unit 2 are inputted from the external device preceding the image processor 1 to the chrominance signal processing unit 3.

Figure 5A:
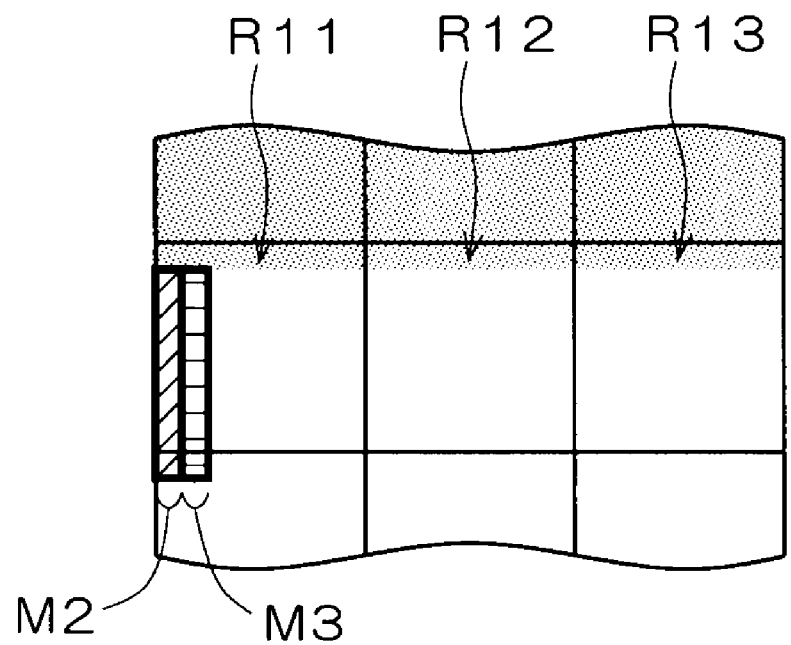
FIGS. 5A and 5B are diagrams illustrating how the image processor operates.
Figure 5B:
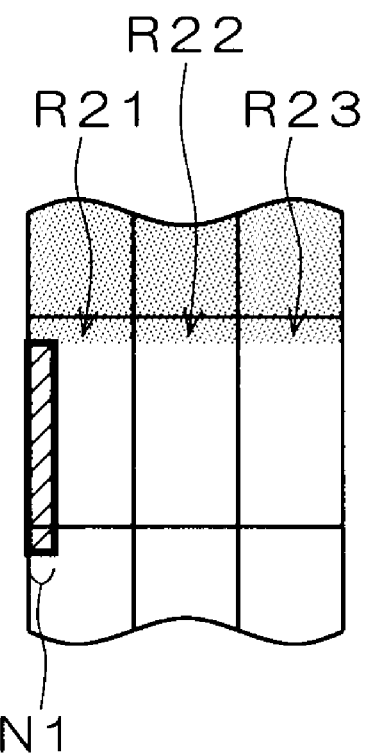

Referring next to FIG. 5A, the luminance signals of a region M2, which is the left 2 columns in the region M1, are transmitted from the signal input unit 21 to the pre-filter 22. The luminance signals of a region M3, which is the right 2 columns in the region M1, are not transmitted to the pre-filter 22 at this time but are stored in the memory unit 24. Referring to FIG. 5B, the chrominance signals of the region N1 are inputted to the pre-filter 32.

Figure 6A:
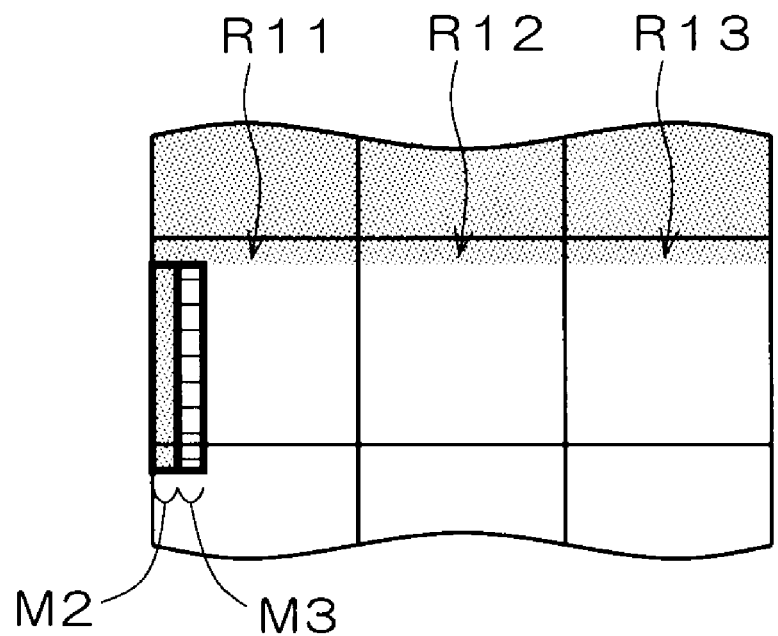
FIGS. 6A and 6B are diagrams illustrating how the image processor operates.
Figure 6B:
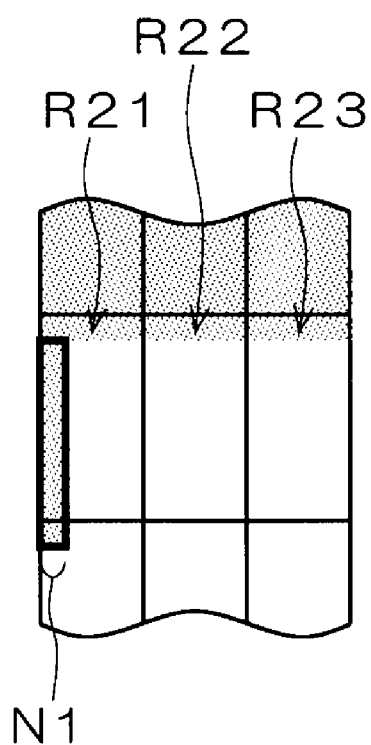

Referring next to FIG. 6A, the pre-filter 22 performs prefiltering on the 16 in column×2 in row luminance signals of the region M2, using a 4 rows×2 columns prefiltering element for four times. Referring to FIG. 6B, the pre-filter 32 performs prefiltering on the 16 in column×2 in row chrominance signals of the region N1, using a 4 rows×2 columns prefiltering element for four times.

Figure 7A:
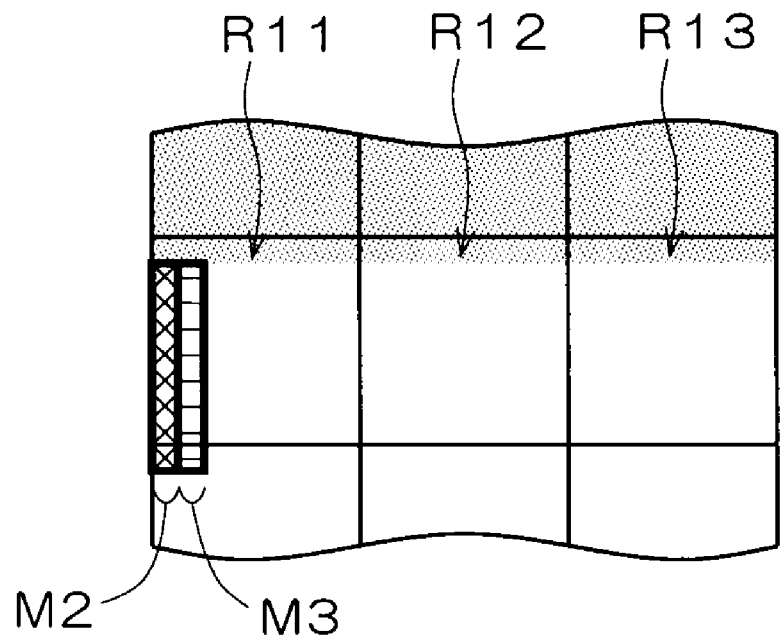
FIGS. 7A and 7B are diagrams illustrating how the image processor operates.

Referring next to FIG. 7A, the luminance signals after prefiltering of the region M2 are stored in the memory unit 25.

Figure 7B:
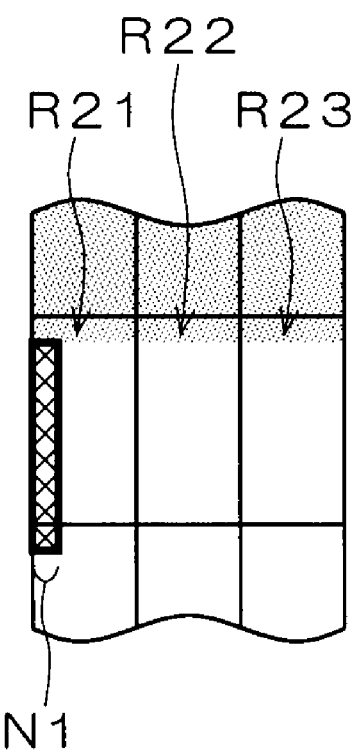

Referring to FIG. 7B, the chrominance signals after prefiltering of the region N1 are stored in the memory unit 35.

<Second Input Step to Image Processor 1>

Figure 8A:
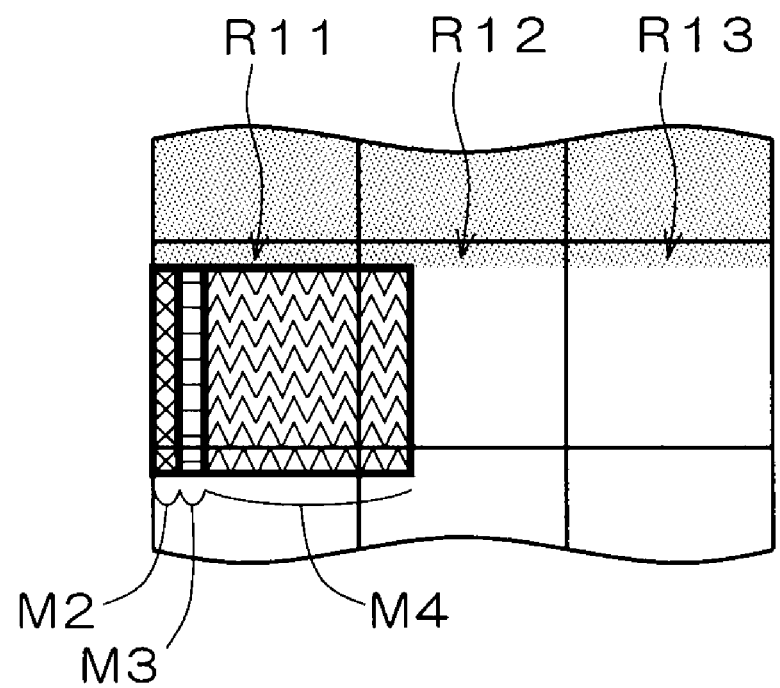
FIGS. 8A and 8B are diagrams illustrating how the image processor operates.
Figure 8B:
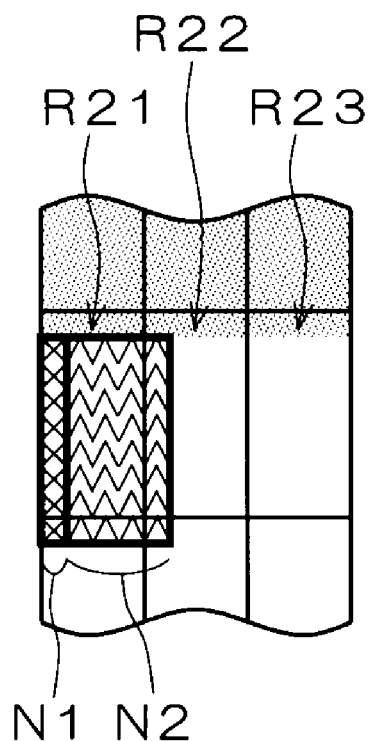

Referring next to FIG. 8A, 16 in column×16 in row luminance signals (region M4) that are equivalent to a pixel block having 16 pixels in column×16 pixels in row are inputted from the external device preceding the image processor 1 to the signal input unit 21 of the luminance signal processing unit 2. Referring to FIG. 8B, 16 in column×8 in row (region N2) chrominance signals that are equivalent to the identical pixel block (16 pixels in column×16 pixels in row) whose luminance signals are inputted to the luminance signal processing unit 2 are inputted from the external device preceding the image processor 1 to the chrominance signal processing unit 3.

Figure 9A:
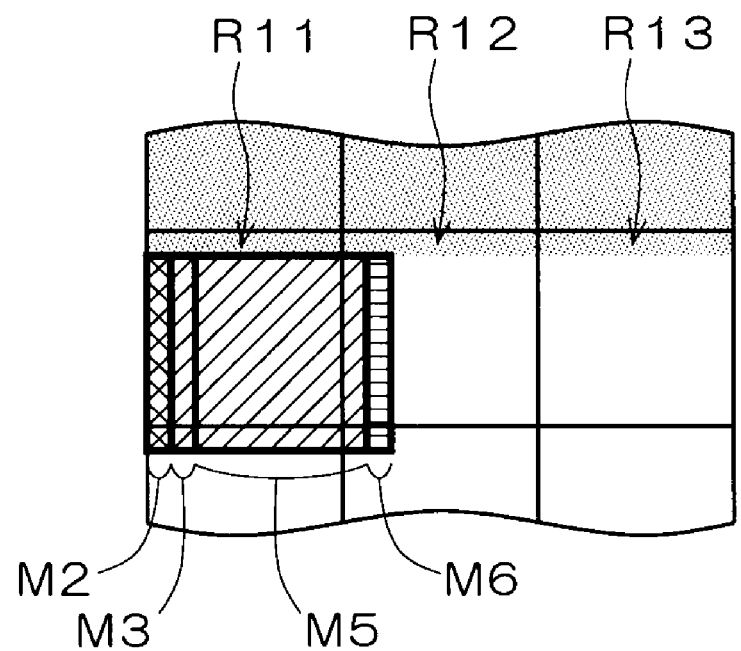
FIGS. 9A and 9B are diagrams illustrating how the image processor operates.
Figure 9B:
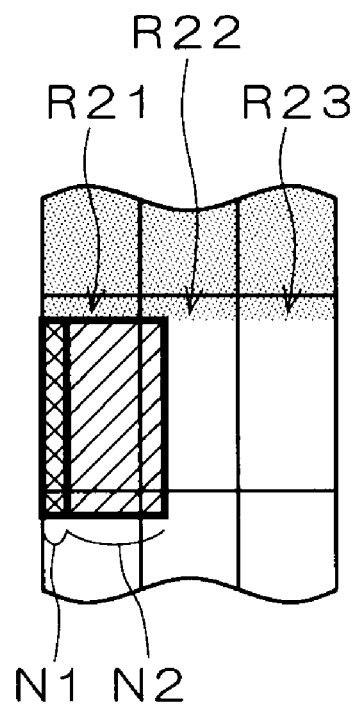

Referring next to FIG. 9A, the luminance signals of the region M3 read from the memory unit 24 and the luminance signals of a region M5, which is the left 14 columns in the region M4, are transmitted from the signal input unit 21 to the pre-filter 22. The luminance signals of a region M6, which is the right 2 columns in the region M4, are not transmitted to the pre-filter 22 at this time but are stored in the memory unit 24. Referring to FIG. 9B, the chrominance signals of the region N2 are inputted to the pre-filter 32.

Figure 10A:
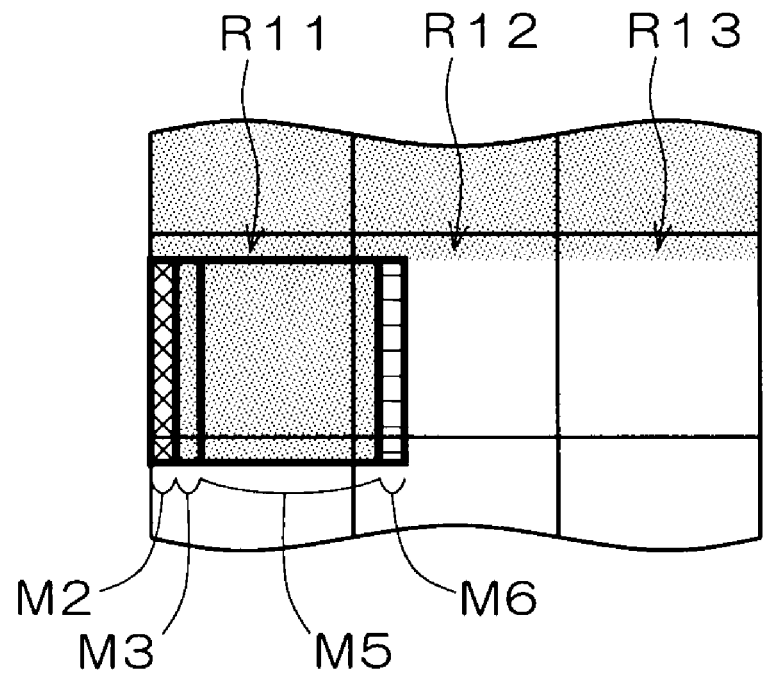
FIGS. 10A and 10B are diagrams illustrating how the image processor operates.
Figure 10B:
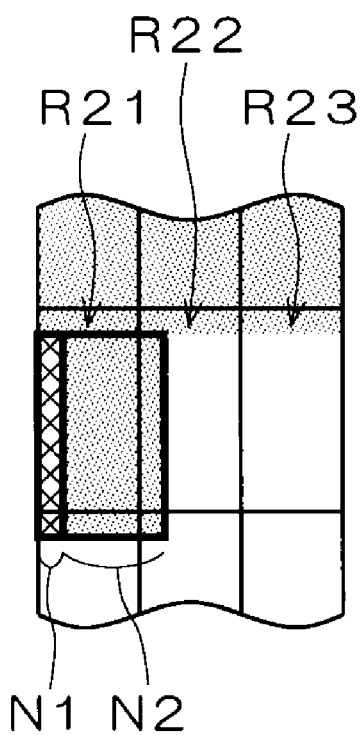

Referring next to FIG. 10A, the pre-filter 22 performs prefiltering on the 16 in column×16 in row luminance signals of the regions M3 and M5, using a 4 rows×4 columns prefiltering element for sixteen times. Referring to FIG. 10B, the pre-filter 32 performs prefiltering on the 16 in column×8 in row chrominance signals of the region N2, using a 4 rows×4 columns prefiltering element for eight times.

Figure 11A:
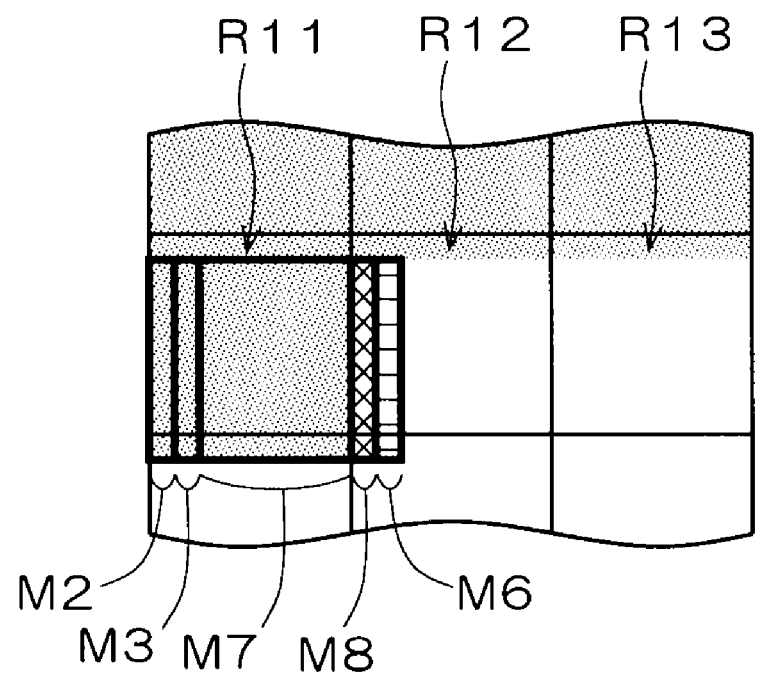
FIGS. 11A and 11B are diagrams illustrating how the image processor operates.

Referring next to FIG. 11A, the luminance signals after prefiltering of a region M8, which is the right 2 columns in the region M5, are stored in the memory unit 25. Meanwhile, the 16 in column×16 in row luminance signals after prefiltering of the pixel block R11 are transmitted from the pre-filter 22 to the frequency transform unit 23. Specifically, the luminance signals of the top 2 rows within the pixel block R11 read from the memory unit 26, the luminance signals of the top 14 rows in the region M2 read from the memory unit 25, the luminance signals of the top 14 rows in the region M3, and the luminance signals of the top 14 rows in a region M7, which is the left 12 columns in the region M5, are transmitted from the pre-filter 22 to the frequency transform unit 23. The frequency transform unit 23 performs frequency transform on the luminance signals transmitted thereto. The luminance signals after prefiltering of the bottom 2 rows in the regions M2, M3 and M7 are stored in the memory unit 26.

Figure 11B:
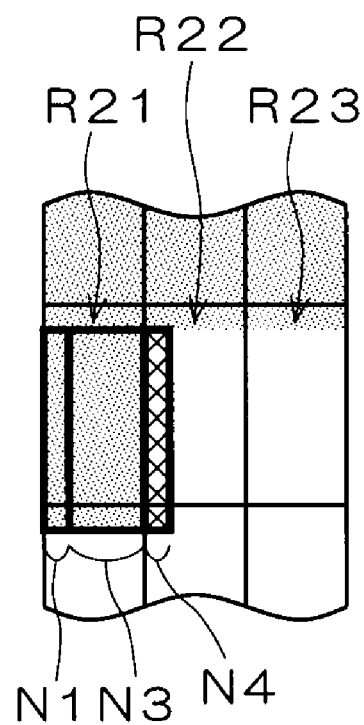

Referring to FIG. 11B, the chrominance signals after prefiltering of a region N4, which is the right 2 columns in the region N2, are stored in the memory unit 35. Meanwhile, the 16 in column×8 in row chrominance signals after prefiltering of the pixel block R21 are transmitted from the pre-filter 32 to the frequency transform unit 33. Specifically, the chrominance signals of the top 2 rows within the pixel block R21 read from the memory unit 36, the chrominance signals of the top 14 rows in the region N1 read from the memory unit 35, and the chrominance signals of the top 14 rows in a region N3, which is the left 6 columns in the region N2, are transmitted from the pre-filter 32 to the frequency transform unit 33. The frequency transform unit 33 performs frequency transform on the chrominance signals transmitted thereto. The chrominance signals after prefiltering of the bottom 2 rows in the regions N1 and N3 are stored in the memory unit 36.

<Third Input Step to Image Processor 1>

Figure 12A:
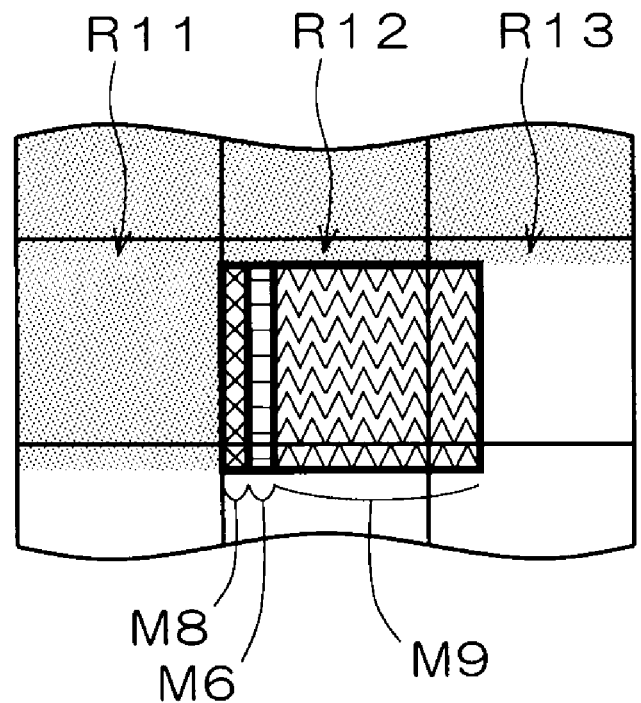
FIGS. 12A and 12B are diagrams illustrating how the image processor operates.
Figure 12B:
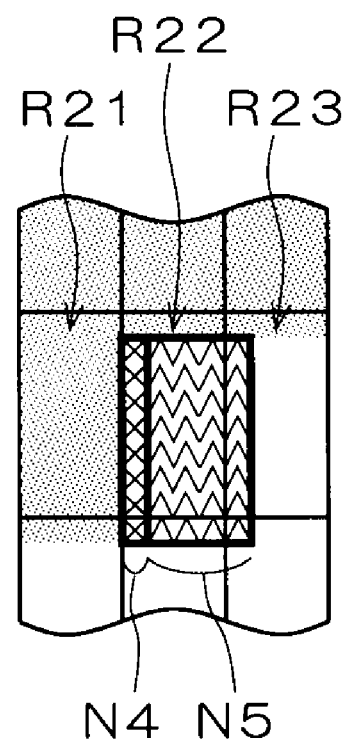

Referring next to FIG. 12A, 16 in column×16 in row luminance signals (region M9) that are equivalent to a pixel block having 16 pixels in column×16 pixels in row are inputted from the external device preceding the image processor 1 to the signal input unit 21 of the luminance signal processing unit 2. Referring to FIG. 12B, 16 in column×8 in row chrominance signals (region N5) that are equivalent to the identical pixel block (16 pixels in column×16 pixels in row) whose luminance signals are inputted to the luminance signal processing unit 2 are inputted from the external device preceding the image processor 1 to the chrominance signal processing unit 3.

Figure 13A:
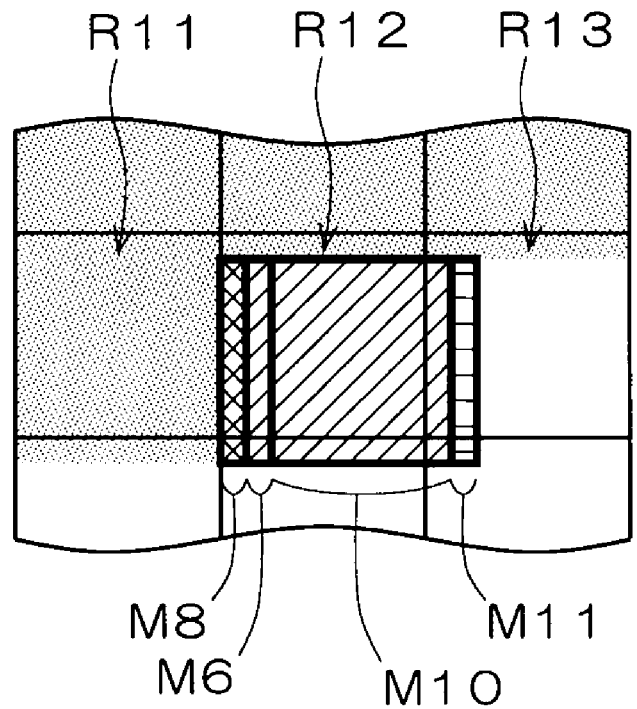
FIGS. 13A and 13B are diagrams illustrating how the image processor operates.
Figure 13B:
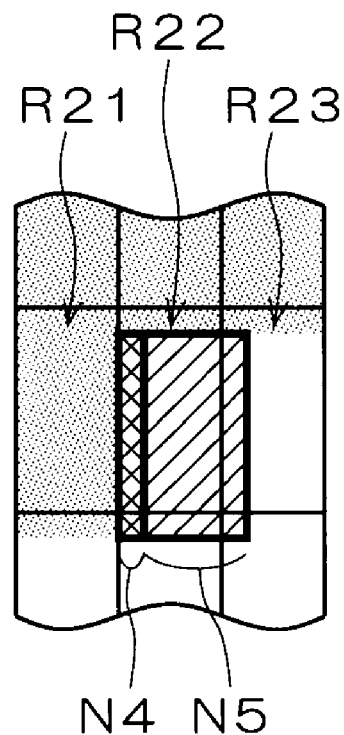

Referring next to FIG. 13A, the luminance signals of the region M6 read from the memory unit 24 and the luminance signals of a region M10, which is the left 14 columns in the region M9, are transmitted from the signal input unit 21 to the pre-filter 22. The luminance signals of a region M11, which is the right 2 columns in the region M9, are not transmitted to the pre-filter 22 at this time but are stored in the memory unit 24. Referring to FIG. 13B, the chrominance signals of the region N5 are inputted to the pre-filter 32.

Figure 14A:
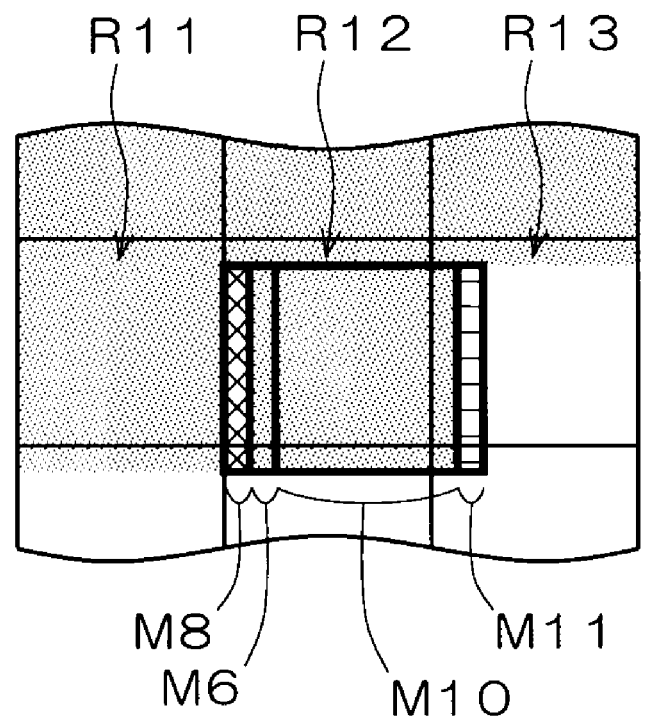
FIGS. 14A and 14B are diagrams illustrating how the image processor operates.
Figure 14B:
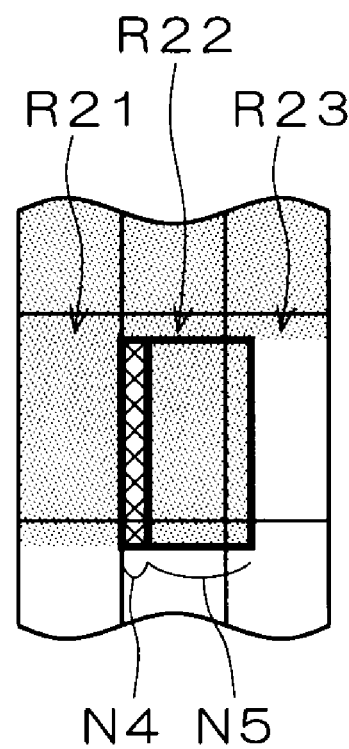

Referring next to FIG. 14A, the pre-filter 22 performs prefiltering on the 16 in column×16 in row luminance signals of the regions M6 and M10, using a 4 rows×4 columns prefiltering element for sixteen times. Referring to FIG. 14B, the pre-filter 32 performs prefiltering on the 16 in column×8 in row chrominance signals of the region N5, using a 4 rows×4 columns prefiltering element for eight times.

Figure 15A:
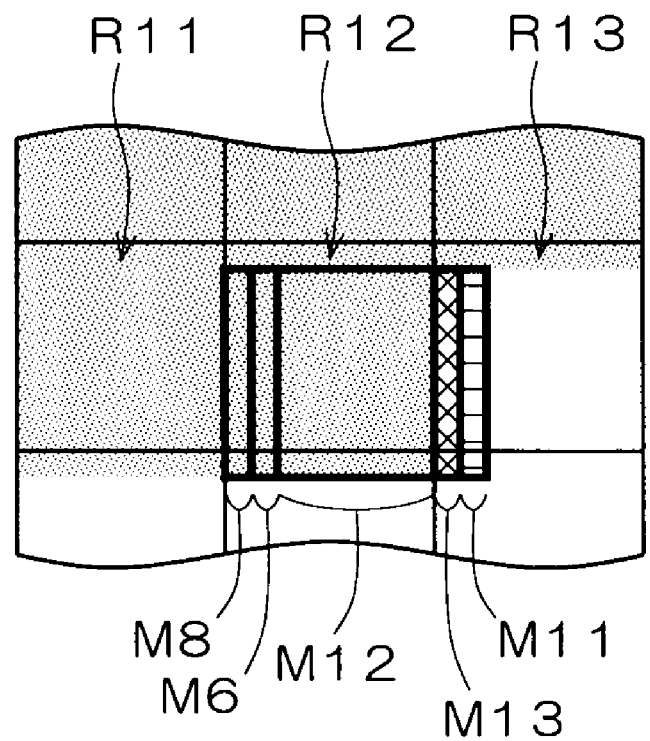
FIGS. 15A and 15B are diagrams illustrating how the image processor operates.

Referring next to FIG. 15A, the luminance signals after prefiltering of a region M13, which is the right 2 columns in the region M10, are stored in the memory unit 25. Meanwhile, the 16 in column×16 in row luminance signals after prefiltering of the pixel block R12 are transmitted from the pre-filter 22 to the frequency transform unit 23. Specifically, the luminance signals of the top 2 rows within the pixel block R12 read from the memory unit 26, the luminance signals of the top 14 rows in the region M8 read from the memory unit 25, the luminance signals of the top 14 rows in the region M6, and the luminance signals of the top 14 rows in a region M12, which is the left 12 columns in the region M10, are transmitted from the pre-filter 22 to the frequency transform unit 23. The frequency transform unit 23 performs frequency transform on the luminance signals transmitted thereto. The luminance signals after prefiltering of the bottom 2 rows in the regions M8, M6 and M12 are stored in the memory unit 26.

Figure 15B:
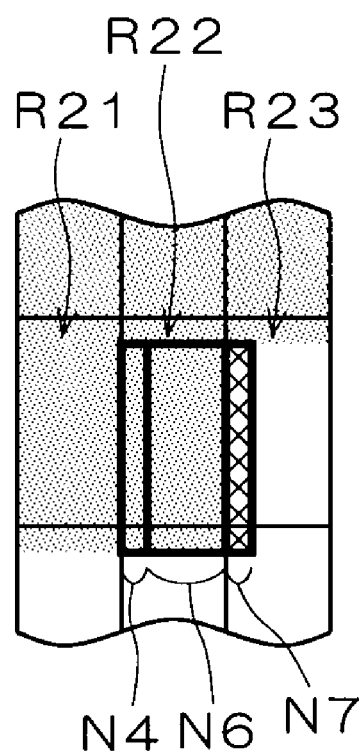

Referring to FIG. 15B, the chrominance signals after prefiltering of a region N7, which is the right 2 columns in the region N5, are stored in the memory unit 35. Meanwhile, the 16 in column×8 in row chrominance signals after prefiltering of the pixel block R22 are transmitted from the pre-filter 32 to the frequency transform unit 33. Specifically, the chrominance signals of the top 2 rows within the pixel block R22 read from the memory unit 36, the chrominance signals of the top 14 rows in the region N4 read from the memory unit 35, and the chrominance signals of the top 14 rows in a region N6, which is the left 6 columns in the region N5, are transmitted from the pre-filter 32 to the frequency transform unit 33. The frequency transform unit 33 performs frequency transform on the chrominance signals transmitted thereto. The chrominance signals after prefiltering of the bottom 2 rows in the regions N4 and N6 are stored in the memory unit 36.

<Fourth Input Step to Image Processor 1>

Figure 16A:
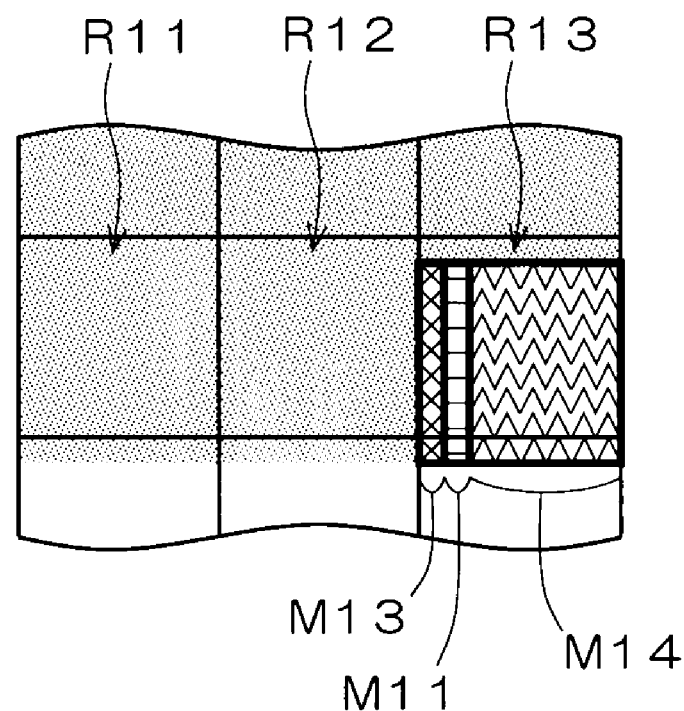
FIGS. 16A and 16B are diagrams illustrating how the image processor operates.
Figure 16B:
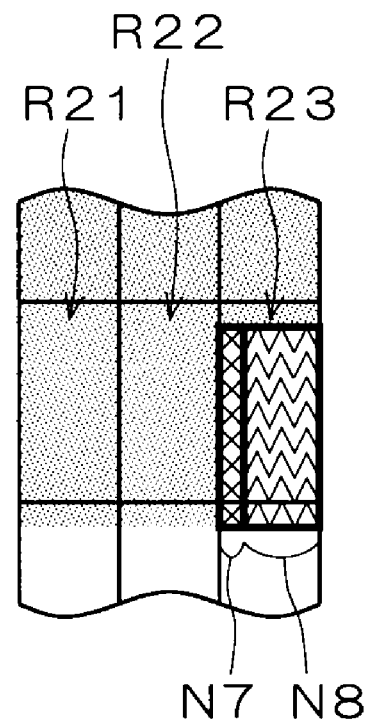

Referring next to FIG. 16A, 16 in column×12 in row luminance signals (region M14) that are equivalent to a pixel block having 16 pixels in column×12 pixels in row are inputted from the external device preceding the image processor 1 to the signal input unit 21 of the luminance signal processing unit 2. Referring to FIG. 16B, 16 in column×6 in row chrominance signals (region N8) that are equivalent to the identical pixel block (16 pixels in column×12 pixels in row) whose luminance signals are inputted to the luminance signal processing unit 2 are inputted from the external device preceding the image processor 1 to the chrominance signal processing unit 3. To simplify the description, in the following illustration, no consideration is given to input of luminance or chrominance signals of the pixel blocks in the tier below the pixel blocks R11 to R13 and R21 to R23.

Figure 17A:
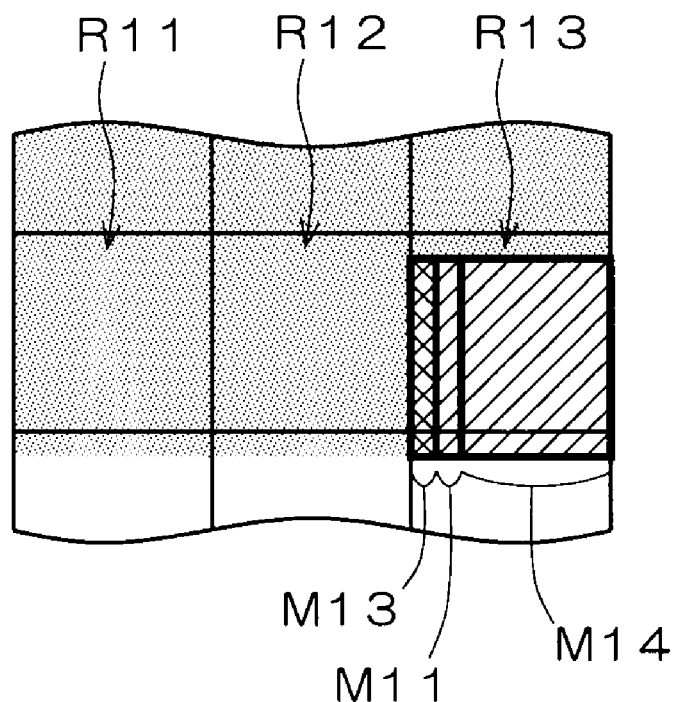
FIGS. 17A and 17B are diagrams illustrating how the image processor operates.
Figure 17B:
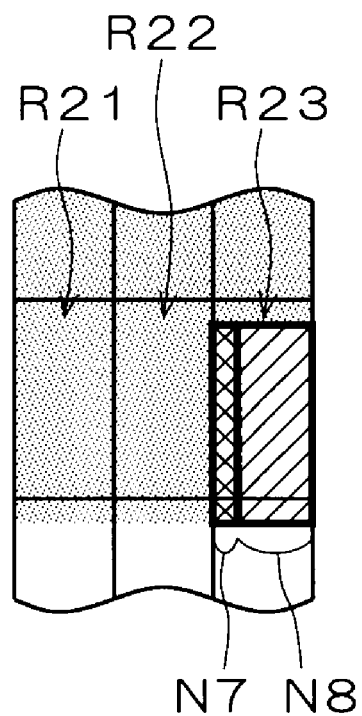

Referring next to FIG. 17A, the luminance signals of the region M11 read from the memory unit 24 and the luminance signals of the region M14 are transmitted from the signal input unit 21 to the pre-filter 22. Referring to FIG. 17B, the chrominance signals of the region N8 are inputted to the pre-filter 32.

Figure 18A:
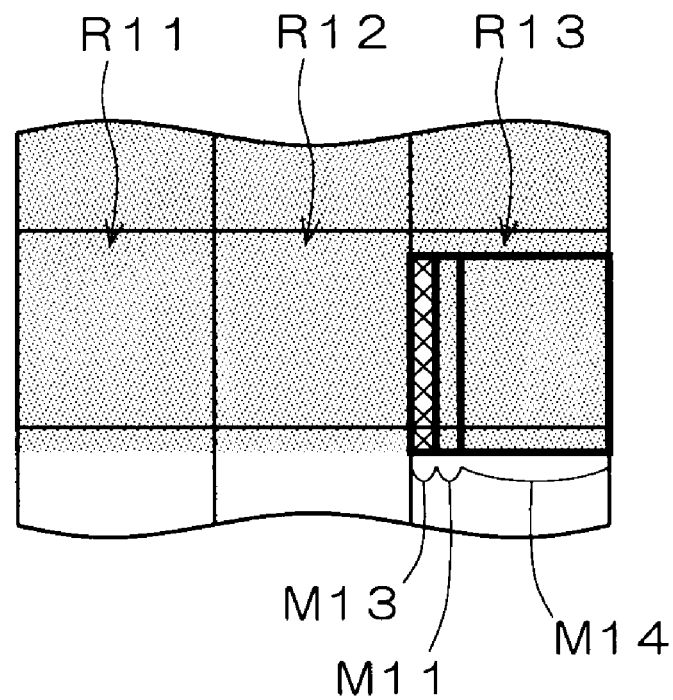
FIGS. 18A and 18B are diagrams illustrating how the image processor operates.
Figure 18B:
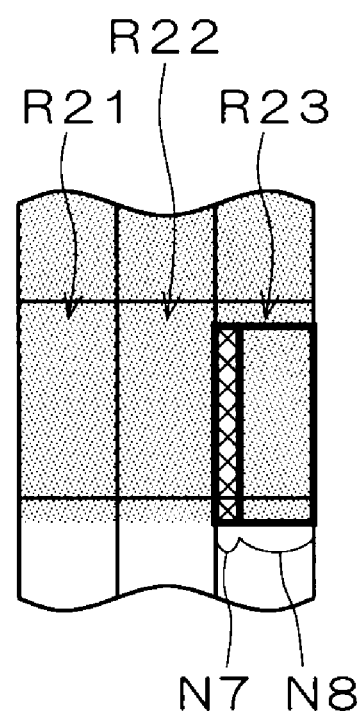

Referring next to FIG. 18A, the pre-filter 22 performs prefiltering on the 16 in column×14 in row luminance signals of the regions M11 and M14, using a 4 rows×4 columns prefiltering element for twelve times and a 4 rows×2 columns prefiltering element for four times. Referring to FIG. 18B, the pre-filter 32 performs prefiltering on the 16 in column×6 in row chrominance signals of the region N8, using a 4 rows×4 columns prefiltering element for four times and a 4 rows×2 columns prefiltering element for four times.

Figure 19A:
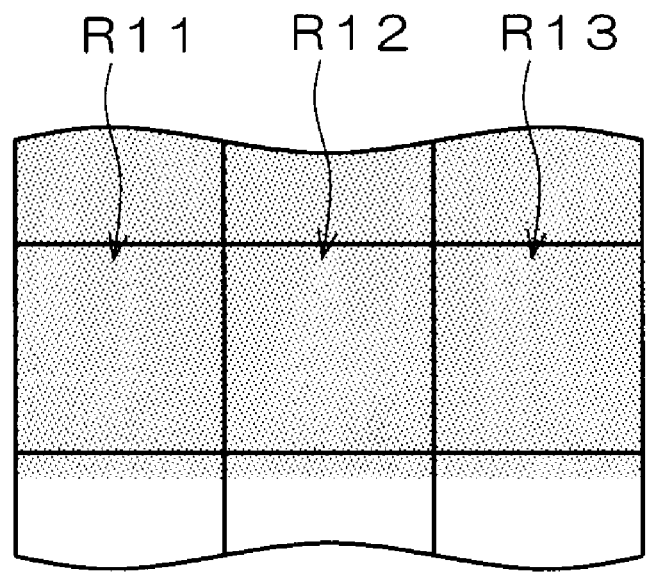
FIGS. 19A and 19B are diagrams illustrating how the image processor operates.

Referring next to FIG. 19A (and FIG. 18A), the 16 in column×16 in row luminance signals after prefiltering of the pixel block R13 are transmitted from the pre-filter 22 to the frequency transform unit 23. Specifically, the luminance signals of the top 2 rows within the pixel block R13 read from the memory unit 26, the luminance signals of the top 14 rows in the region M13 read from the memory unit 25, the luminance signals of the top 14 rows in the region M11, and the luminance signals of the top 14 rows in the region M14 are transmitted from the pre-filter 22 to the frequency transform unit 23. The frequency transform unit 23 performs frequency transform on the luminance signals transmitted thereto. The luminance signals after prefiltering of the bottom 2 rows in the regions M13, M11 and M14 are stored in the memory unit 26.

Figure 19B:
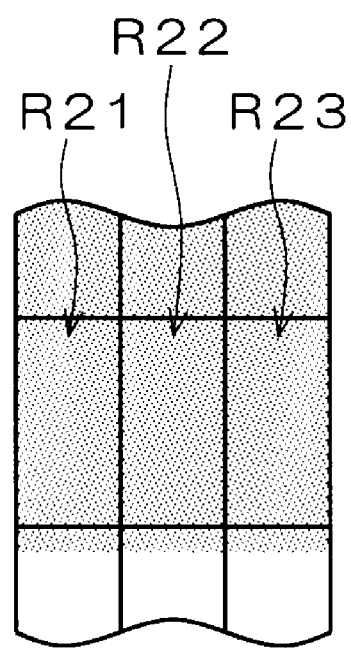

Referring to FIG. 19B (and FIG. 18B), the 16 in column×8 in row chrominance signals after prefiltering of the pixel block R23 are transmitted from the pre-filter 32 to the frequency transform unit 33. Specifically, the chrominance signals of the top 2 rows within the pixel block R23 read from the memory unit 36, the chrominance signals of the top 14 rows in the region N7 read from the memory unit 35, and the chrominance signals of the top 14 rows in the region N8 are transmitted from the pre-filter 32 to the frequency transform unit 33. The frequency transform unit 33 performs frequency transform on the chrominance signals transmitted thereto. The chrominance signals after prefiltering of the bottom 2 rows in the regions N7 and N8 are stored in the memory unit 36.

<Summary>

In an image processor 1 according to the first preferred embodiment, in a first input step from outside to the image processor 1, the signal input unit 21 inputs to the pre-filter 22 a first part (region M2) of first luminance signals (region M1) inputted from outside, which is a part to be processed by the pre-filter 22 in the first input step, and stores a remaining second part (region M3) of the first luminance signals in the memory unit 24. In a second input step following the first input step, the signal input unit 21 inputs to the pre-filter 22 the second part (region M3) of the first luminance signals read from the memory unit 24 and a first part (region M5) of second luminance signals (region M4) inputted from outside, which is a part to be processed by the pre-filter 22 in the second input step, and stores a remaining second part (region M6) of the second luminance signals in the memory unit 24. In a third and subsequent input steps, the same operations as the second input step are repeated.

Furthermore, as shown in FIG. 4, luminance signals (region M1) and chrominance signals (region N1) corresponding to a pixel block in an identical position within a pixel plane are concurrently inputted to the luminance signal processing unit 2 and the chrominance signal processing unit 3 in the first input step. Similarly, as shown in FIG. 8, luminance signals (region M4) and chrominance signals (region N2) corresponding to a pixel block in an identical position within a pixel plane are concurrently inputted to the luminance signal processing unit 2 and the chrominance signal processing unit 3 in the second input step. The same applies to the third and subsequent input steps.

Thus the image processor 1 according to the first preferred embodiment prevents difference in the position within a pixel plane between a pixel processed by the luminance signal processing unit 2 and a pixel processed by the chrominance signal processing unit 3, before the luminance and chrominance signals are inputted to the frequency transform units 22 and 33.

<Second Preferred Embodiment>

Figure 20:
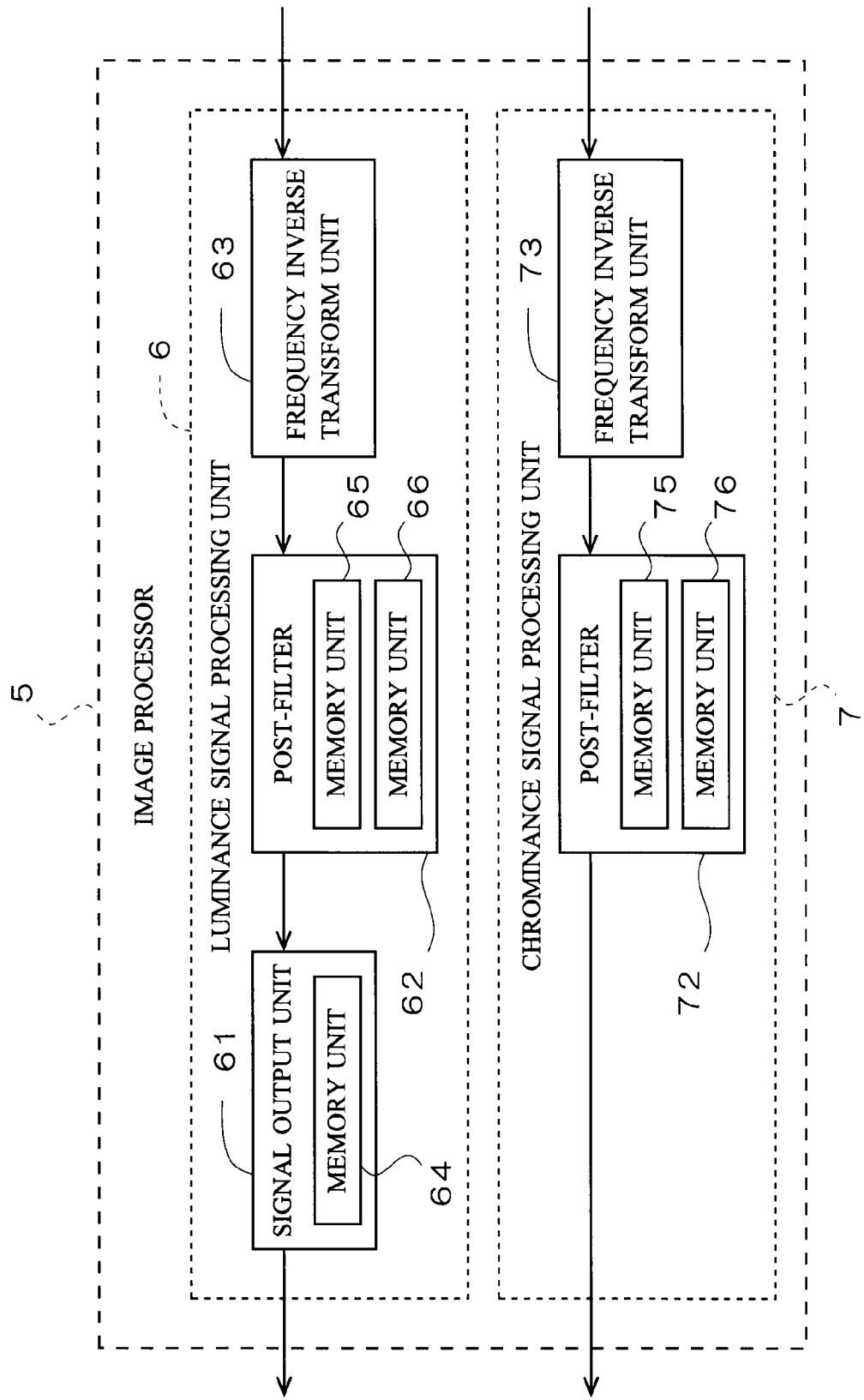
FIG. 20 is a block diagram showing a configuration of an image processor according to a second preferred embodiment of the present invention.

FIG. 20 is a block diagram showing a configuration of an image processor 5 according to a second preferred embodiment of the present invention. The image processor 5 includes a luminance signal processing unit 6 and a chrominance signal processing unit 7. The image processor 5 is capable of processing an image in which there are a smaller number of chrominance signals than luminance signals within a row of a pixel plane. In the following example, the luminance signal processing unit 6 processes a Y signal in YUV422 format, and the chrominance signal processing unit 7 processes U and V signals in YUV422 format.

The luminance signal processing unit 6 includes a signal output unit 61, a post-filter 62, and a frequency inverse transform unit 63. The signal output unit 61 has a memory unit 64, and the post-filter 62 has memory units 65 and 66. The memory unit 66 is a line memory with capacity in accordance with the length of a row in a pixel plane. In contrast, capacity of each of the memory units 64 and 65 is independent of the length of a row in a pixel plane.

The chrominance signal processing unit 7 includes a post-filter 72 and a frequency inverse transform unit 73. The post-filter 72 has memory units 75 and 76. The memory unit 76 is a line memory with capacity in accordance with the length of a row in a pixel plane. In contrast, capacity of the memory unit 75 is independent of the length of a row in a pixel plane.

FIG. 20 shows an example of the luminance signal processing unit 6 and the chrominance signal processing unit 7 respectively including the post-filters 62 and 72, but the luminance signal processing unit 6 and the chrominance signal processing unit 7 may share one post-filter. Similarly, FIG. 20 shows an example of the luminance signal processing unit 6 and the chrominance signal processing unit 7 respectively including the frequency inverse transform units 63 and 73, but the luminance signal processing unit 6 and the chrominance signal processing unit 7 may share one frequency inverse transform unit.

Referring to FIG. 2, the frequency inverse transform units 63 and 73 perform predetermined frequency inverse transform, corresponding to the above frequency transform (PCT), with each pixel block RA as a unit region for processing. Furthermore, each of the post-filters 62 and 72 performs predetermined postfiltering, corresponding to the above prefiltering, with each pixel block RB as a unit region for processing. However, at an edge of a pixel plane, a unit region for processing having 4 pixels in column×4 pixels in row is not secured, but a pixel block having 4 pixels in column×2 pixels in row, 2 pixels in column×4 pixels in row, or 2 pixels in column×2 pixels in row serves as a unit region for processing of the post-filters 62 and 72.

As shown in FIG. 2, a pixel block RB1, which is a unit region for processing of the post-filters 62 and 72, overlaps with 4 pixel blocks RA1 to RA4, which are unit regions for processing of the frequency inverse transform units 63 and 73.

FIGS. 21A to 36A are diagrams illustrating how the image processor 5 operates, in relation to the operation of the luminance signal processing unit 6, and FIGS. 21B to 36B are diagrams illustrating how the image processor 5 operates, in relation to the operation of the chrominance signal processing unit 7. In each figure, to simplify the description, pixel blocks corresponding to the macroblocks MB positioned at the left end, center, and right end of a pixel plane are extracted and respectively shown as pixel blocks R31 or R41, R32 or R42, and R33 or R43.

Furthermore, to clearly illustrate, in FIGS. 21A to 36B, the regions whose luminance or chrominance signals have been transmitted from the frequency inverse transform unit 63 or 73 to the post-filter 62 or 72 are indicated by zigzag lines. Similarly, the regions where postfiltering is performed by the post-filter 62 or 72 are indicated by oblique lines. Similarly, the regions whose luminance or chrominance signals have been stored in the memory unit 65 or 75 are indicated by lateral stripes. Similarly, the regions where postfiltering by the post-filter 62 or 72 has been completed are indicated by a sanded pattern. Similarly, the regions whose luminance signals have been stored in the memory unit 64 are indicated by a netted pattern.

Figure 21A:
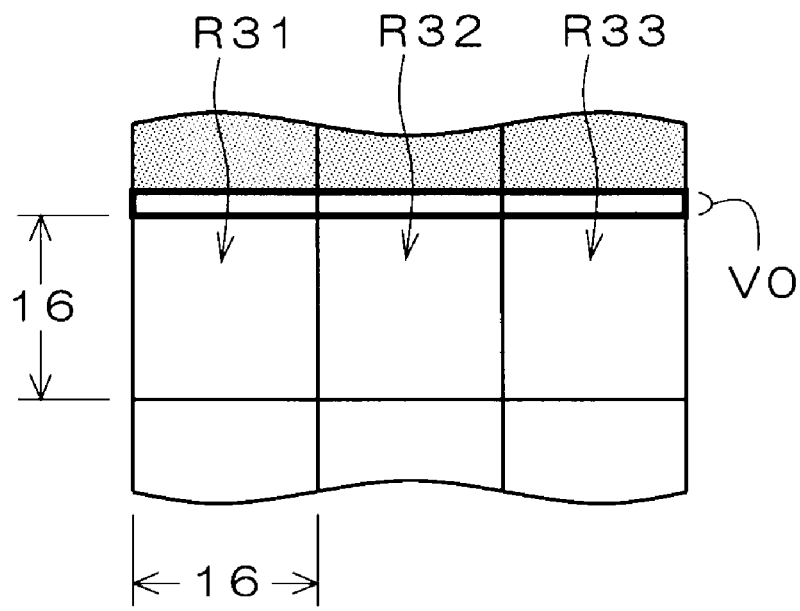
FIGS. 21A and 21B are diagrams illustrating how the image processor operates.
Figure 21B:
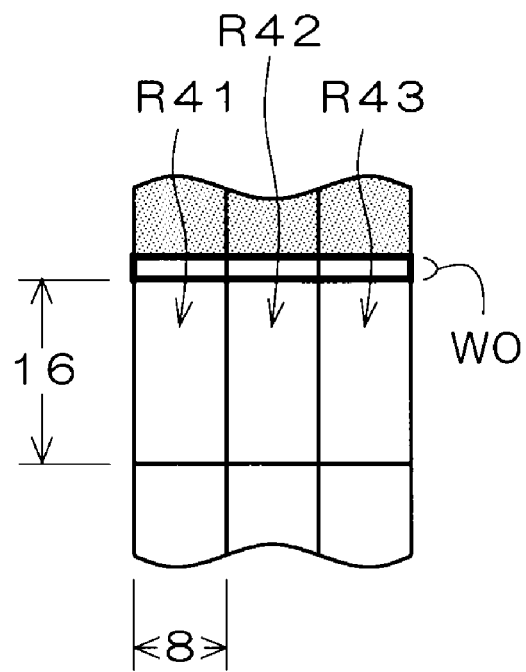

Referring to FIG. 21A, postfiltering by the post-filter 62 of the luminance signals of the top 14 rows within each of the three pixel blocks positioned in the tier above the pixel blocks R31 to R33 has been completed at this time. The luminance signals of a region V0, which is the bottom 2 rows of each of the above three pixel blocks, have been stored in the memory unit 66 without postfiltering by the post-filter 62 being performed. Referring to FIG. 21B, postfiltering by the post-filter 72 of the chrominance signals of the top 14 rows within each of the three pixel blocks positioned in the tier above the pixel blocks R41 to R43 has been completed at this time. The chrominance signals of a region W0, which is the bottom 2 rows of each of the above three pixel blocks, have been stored in the memory unit 76 without postfiltering by the post-filter 72 being performed.

Figure 22A:
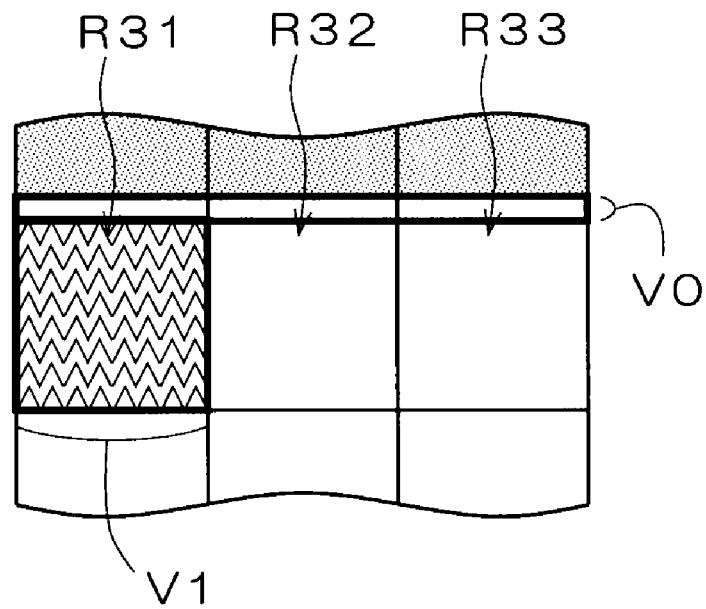
FIGS. 22A and 22B are diagrams illustrating how the image processor operates.
Figure 22B:
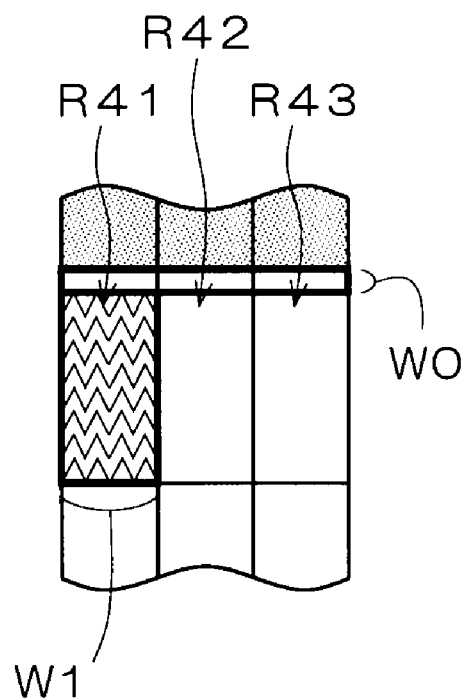

Referring now to FIG. 22A, 16 in column×16 in row luminance signals (region V1) that are equivalent to a pixel block having 16 pixels in column×16 pixels in row are inputted from the frequency inverse transform unit 63 to the post-filter 62. Referring to FIG. 22B, 16 in column×8 in row chrominance signals (region W1) that are equivalent to the identical pixel block (16 pixels in column×16 pixels in row) whose luminance signals are inputted to the post-filter 62 are inputted from the frequency inverse transform unit 73 to the post-filter 72.

Figure 23A:
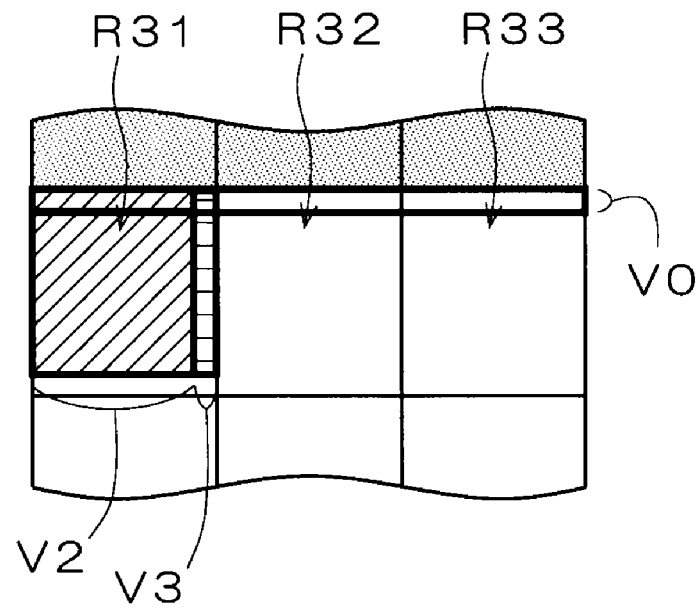
FIGS. 23A and 23B are diagrams illustrating how the image processor operates.

Referring next to FIG. 23A, the post-filter 62 performs postfiltering on the luminance signals of a region V2. The region V2 consists of the top left 14 columns×14 rows in the region V1, and the 2 rows×14 columns in the region V0 abutting on the upper side thereof. The luminance signals of a region V3, which is 16 rows×2 columns abutting on the right side of the region V2, are stored in the memory unit 65 without postfiltering by the post-filter 62 being performed at this time. The luminance signals of the bottom 2 rows in the region V1 are stored in the memory unit 66.

Figure 23B:
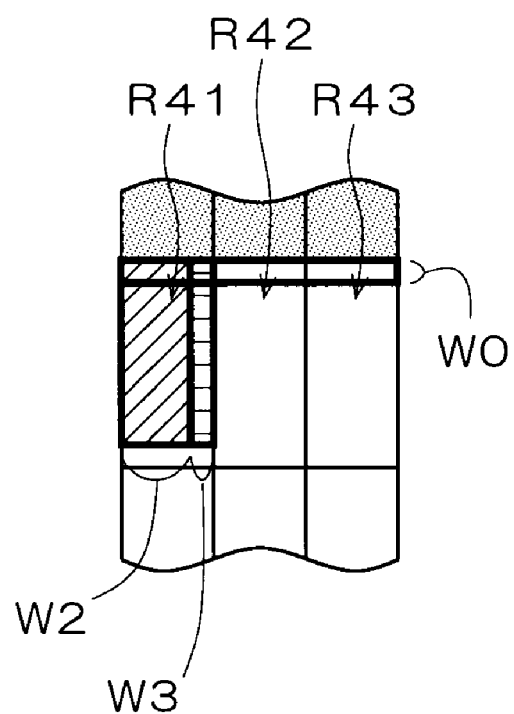

Referring next to FIG. 23B, the post-filter 72 performs postfiltering on the chrominance signals of a region W2. The region W2 consists of the top left 6 columns×14 rows in the region W1, and the 2 rows×6 columns in the region W0 abutting on the upper side thereof. The chrominance signals of a region W3, which is 16 rows×2 columns abutting on the right side of the region W2, are stored in the memory unit 75 without postfiltering by the post-filter 72 being performed at this time. The chrominance signals of the bottom 2 rows in the region W1 are stored in the memory unit 76.

Figure 24A:
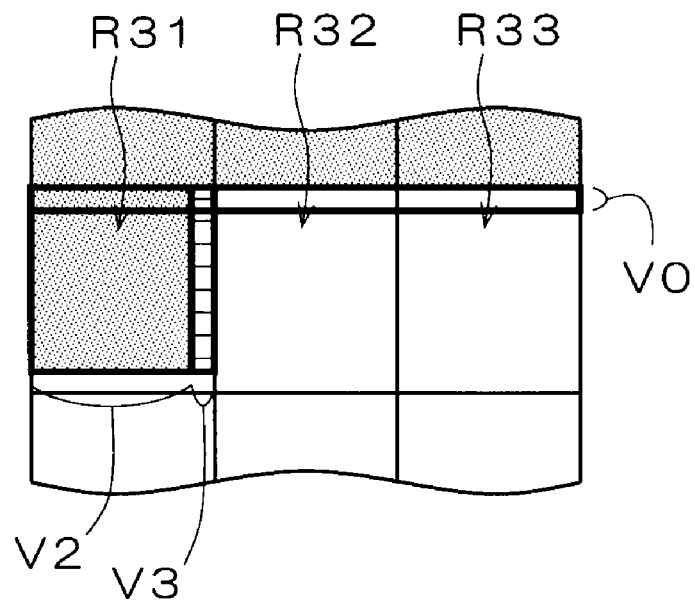
FIGS. 24A and 24B are diagrams illustrating how the image processor operates.
Figure 24B:
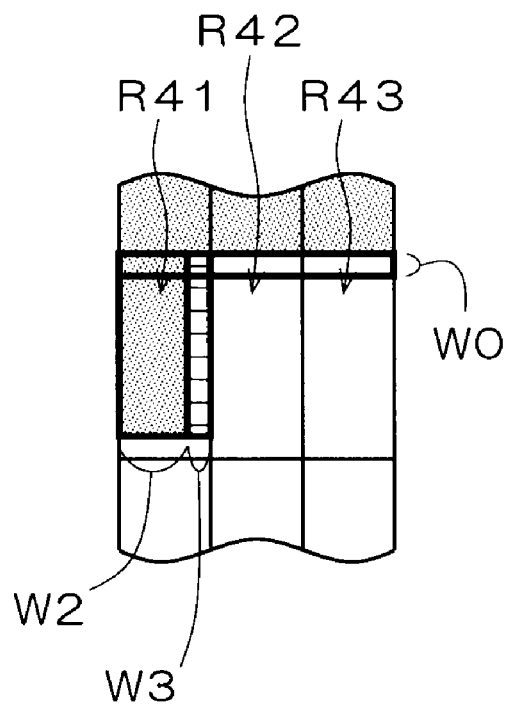

Referring next to FIG. 24A, the post-filter 62 performs postfiltering on the 16 in column×14 in row luminance signals of the region V2, using a 4 rows×2 columns postfiltering element for four times and a 4 rows×4 columns postfiltering element for twelve times. The luminance signals after postfiltering are transmitted to the signal output unit 61. Referring to FIG. 24B, the post-filter 72 performs postfiltering on the 16 in column×16 in row chrominance signals of the region W2, using a 4 rows×2 columns postfiltering element for four times and a 4 rows×4 columns postfiltering element for four times.

<First Output Step from Image Processor 5>

Figure 25A:
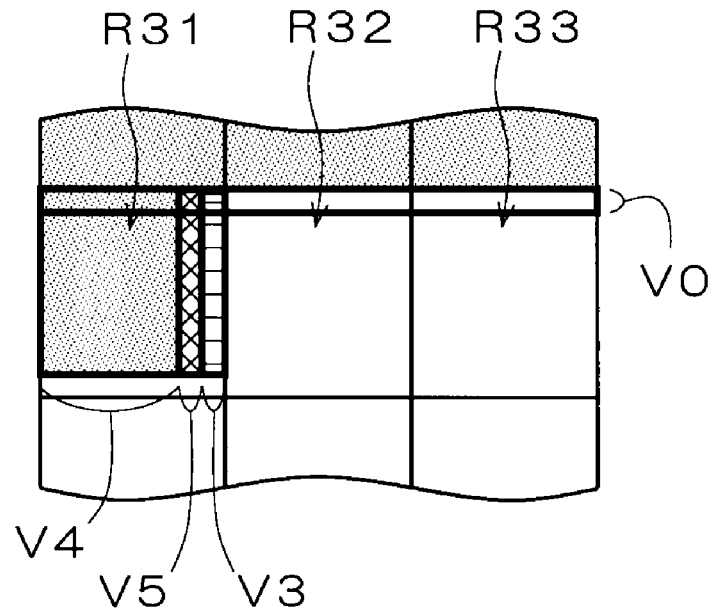
FIGS. 25A and 25B are diagrams illustrating how the image processor operates.
Figure 25B:
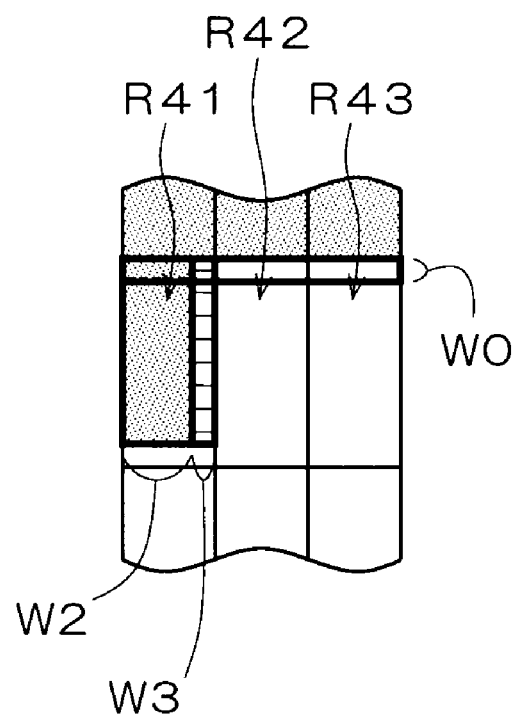

Referring next to FIG. 25A, the luminance signals after postfiltering of a region V4, which is the left 12 columns in the region V2, are outputted from the signal output unit 61 to an external device (for example, a display) subsequent to the image processor 5. The luminance signals after postfiltering of a region V5, which is the right 2 columns in the region V2, are not outputted to outside at this time but are stored in the memory unit 64. Referring to FIG. 25B, the chrominance signals after postfiltering of the region W2 are outputted to the external device subsequent to the image processor 5. The region V4 and the region W2 correspond to an identical pixel block (16 pixels in column×12 pixels in row) within the pixel plane.

Figure 26A:
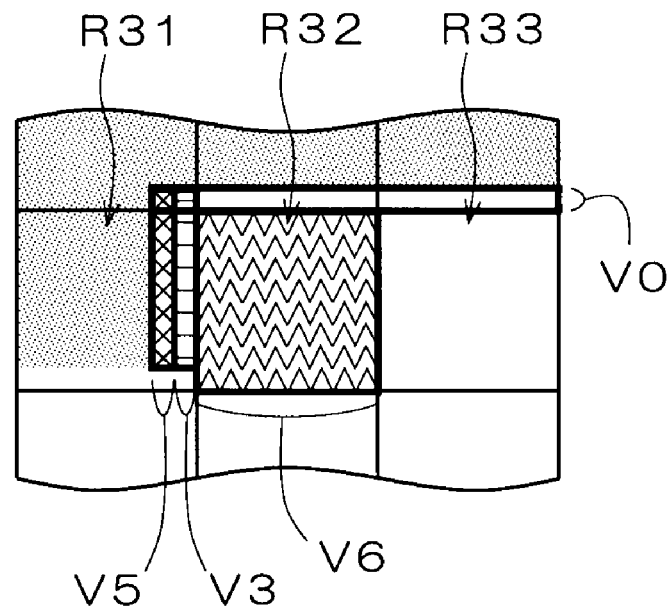
FIGS. 26A and 26B are diagrams illustrating how the image processor operates.
Figure 26B:
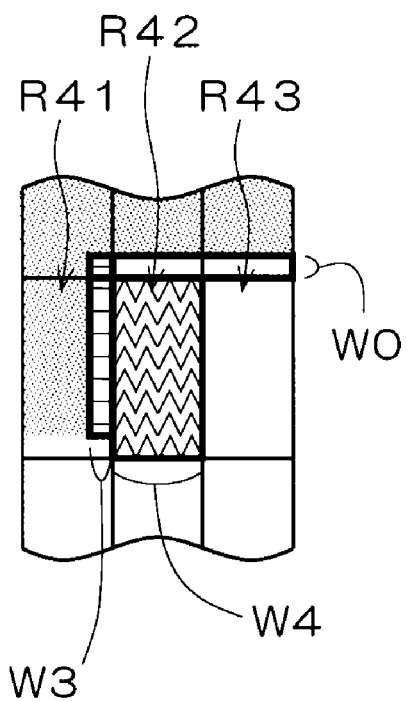

Referring next to FIG. 26A, 16 in column×16 in row luminance signals (region V6) that are equivalent to a pixel block having 16 pixels in column×16 pixels in row are inputted from the frequency inverse transform unit 63 to the post-filter 62. Referring to FIG. 26B, 16 in column×8 in row chrominance signals (region W4) that are equivalent to the identical pixel block (16 pixels in column×16 pixels in row) whose the luminance signals are inputted to the post-filter 62 are inputted from the frequency inverse transform unit 73 to the post-filter 72.

Figure 27A:
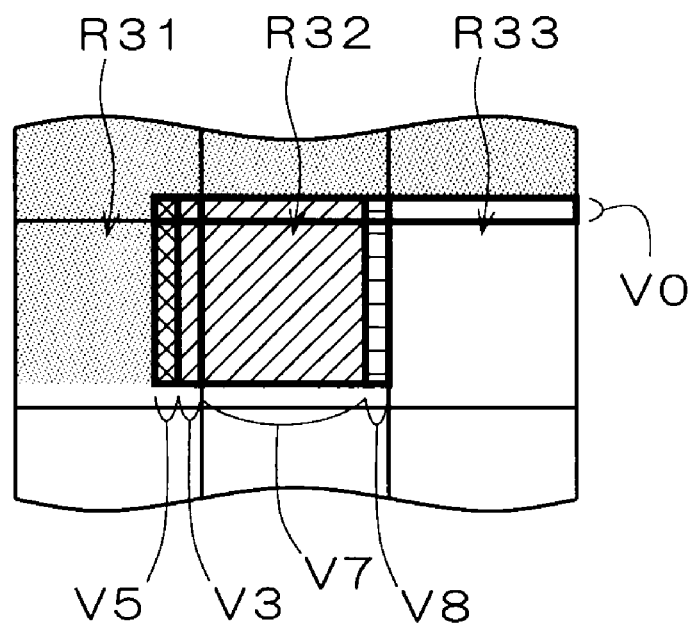
FIGS. 27A and 27B are diagrams illustrating how the image processor operates.

Referring next to FIG. 27A, the post-filter 62 performs postfiltering on the luminance signals of the region V3 read from the memory unit 65 and the luminance signals of a region V7. The region V7 consists of the top left 14 columns× 14 rows in the region V6, and the 2 rows×14 columns in the region V0 abutting on the upper side thereof. The luminance signals of a region V8, which is the 16 rows×2 columns abutting on the right side of the region V7, are stored in the memory unit 65 without postfiltering by the post-filter 62 being performed at this time. The luminance signals of the bottom 2 rows in the region V6 are stored in the memory unit 66.

Figure 27B:
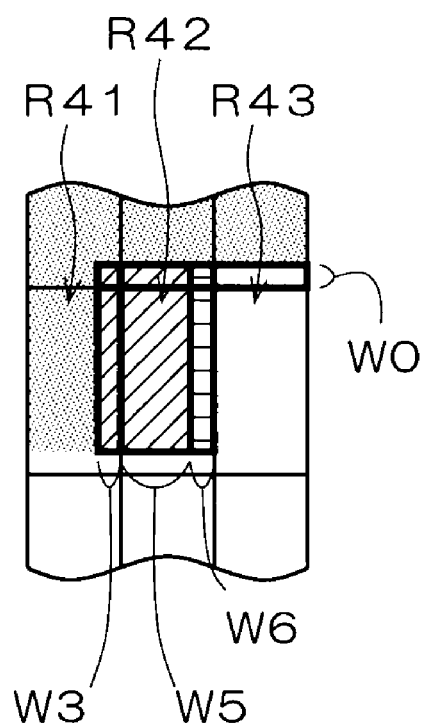

Referring next to FIG. 27B, the post-filter 72 performs postfiltering on the chrominance signals of the region W3 read from the memory unit 75 and the chrominance signals of a region W5. The region W5 consists of the top left 6 columns×14 rows in the region W4, and the 2 rows×6 columns in the region W0 abutting on the upper side thereof. The chrominance signals of a region W6, which is 16 rows×2 columns abutting on the right side of the region W5, are stored in the memory unit 75 without postfiltering by the post-filter 72 being performed at this time. The chrominance signals of the bottom 2 rows in the region W4 are stored in the memory unit 76.

Figure 28A:
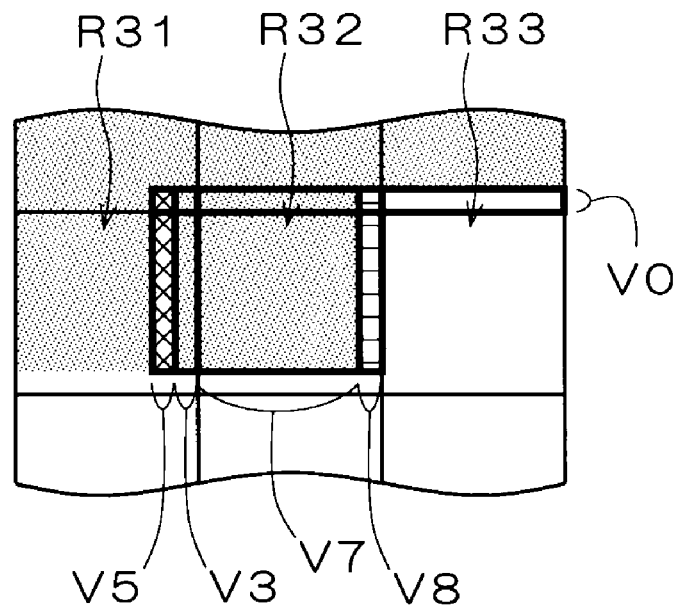
FIGS. 28A and 28B are diagrams illustrating how the image processor operates.
Figure 28B:
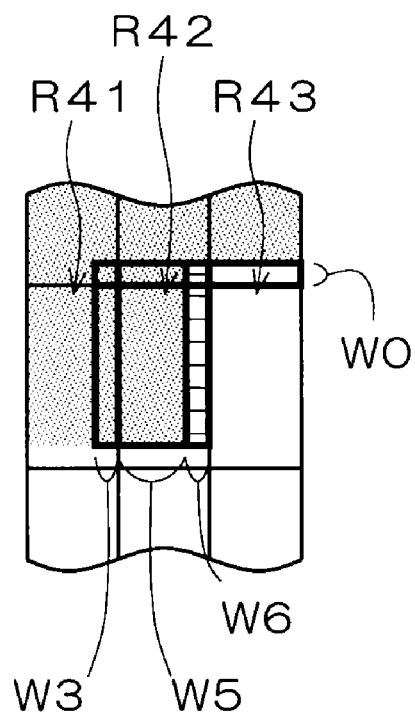

Referring next to FIG. 28A, the post-filter 62 performs postfiltering on the 16 in column×16 in row luminance signals of the regions V3 and V7, using a 4 rows×4 columns postfiltering element for sixteen times. The luminance signals after postfiltering are transmitted to the signal output unit 61. Referring to FIG. 28B, the post-filter 72 performs postfiltering on the 16 in column×8 in row chrominance signals of the regions W3 and W5, using a 4 rows×4 columns postfiltering element for eight times.

<Second Output Step from Image Processor 5>

Figure 29A:
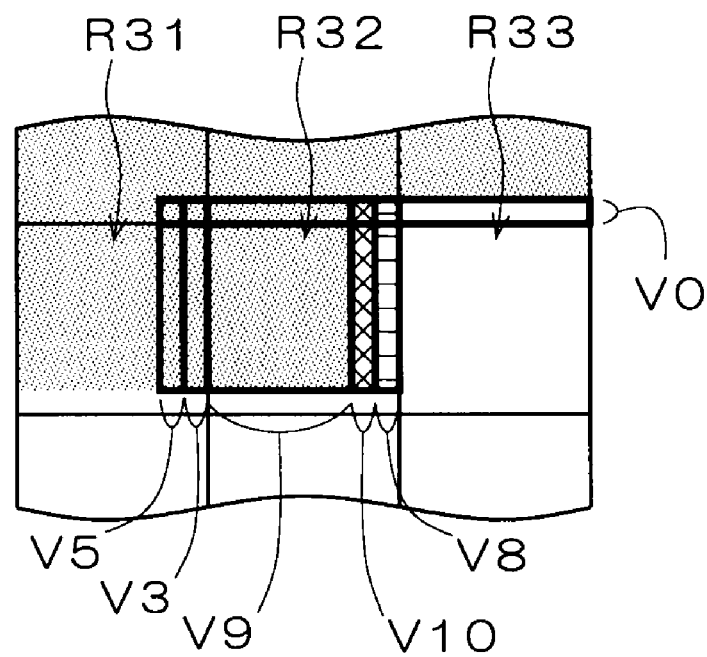
FIGS. 29A and 29B are diagrams illustrating how the image processor operates.
Figure 29B:
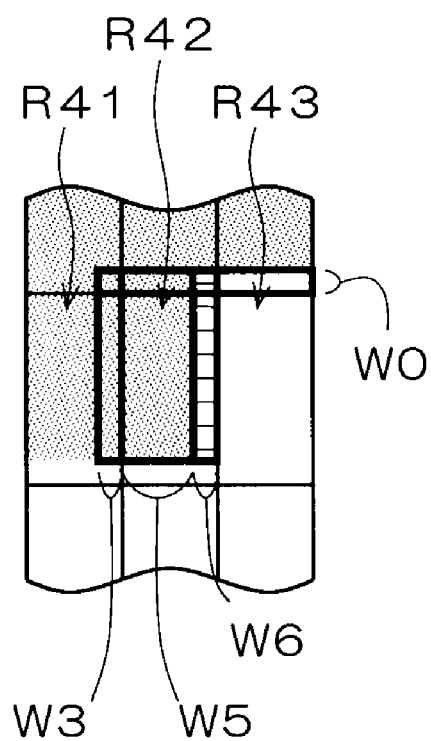

Referring next to FIG. 29A, the luminance signals after postfiltering of the region V5 read from the memory unit 64, the luminance signals after postfiltering of the region V3, and the luminance signals of a region V9, which is the left 12 columns in the region V7, are outputted from the signal output unit 61 to the external device subsequent to the image processor 5. The luminance signals after postfiltering of a region V10, which is the right 2 columns in the region V7, are not outputted to outside at this time but are stored in the memory unit 64. Referring to FIG. 29B, the chrominance signals after postfiltering of the regions W3 and W5 are outputted to the external device subsequent to the image processor 5. The regions V5, V3, and V9, and the regions W3 and W5 correspond to an identical pixel block (16 pixels in column×16 pixels in row) within the pixel plane.

Figure 30A:
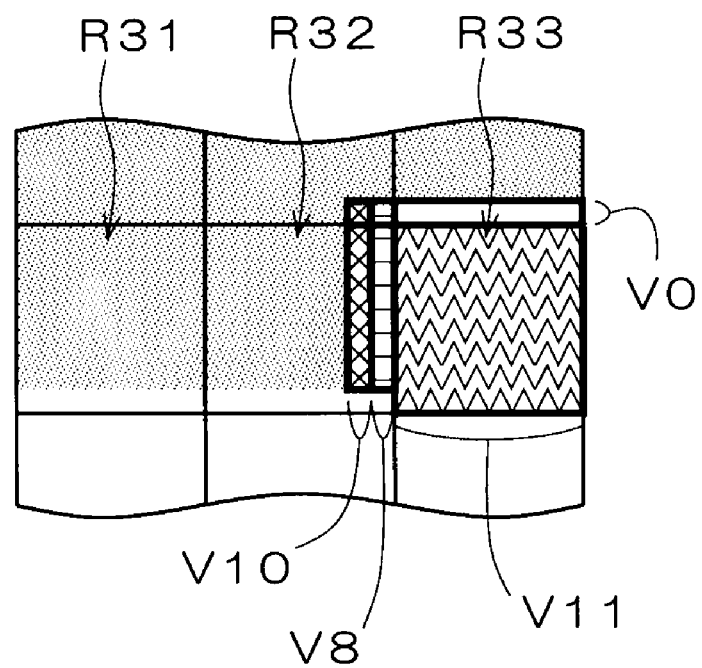
FIGS. 30A and 30B are diagrams illustrating how the image processor operates.
Figure 30B:
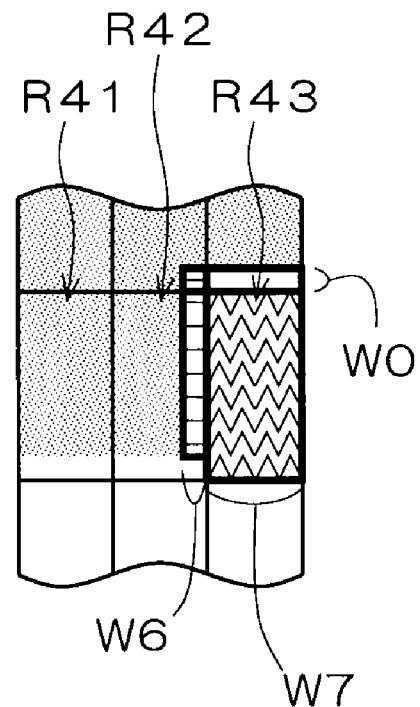

Referring next to FIG. 30A, 16 in column×16 in row luminance signals (region V11) that are equivalent to a pixel block having 16 pixels in column×16 pixels in row are inputted from the frequency inverse transform unit 63 to the post-filter 62. Referring to FIG. 30B, 16 in column×8 in row chrominance signals (region W7) that are equivalent to the identical pixel block (16 pixels in column×16 pixels in row) whose luminance signals are inputted to the post-filter 62 are inputted from the frequency inverse transform unit 73 to the post-filter 72.

Referring next to FIG. 3 1A, the post-filter 62 performs postfiltering on the luminance signals of the region V8 read from the memory unit 65 and the luminance signals of a region V12. The region V12 consists of the top left 14 columns×14 rows in the region V11, and the 2 rows×14 columns in the region V0 abutting on the upper side thereof. The luminance signals of a region V13, which is 16 rows×2 columns abutting on the right side of the region V12, are stored in the memory unit 65 without postfiltering by the post-filter 62 being performed at this time. The luminance signals of the bottom 2 rows in the region V11 are stored in the memory unit 66.

Figure 31A:
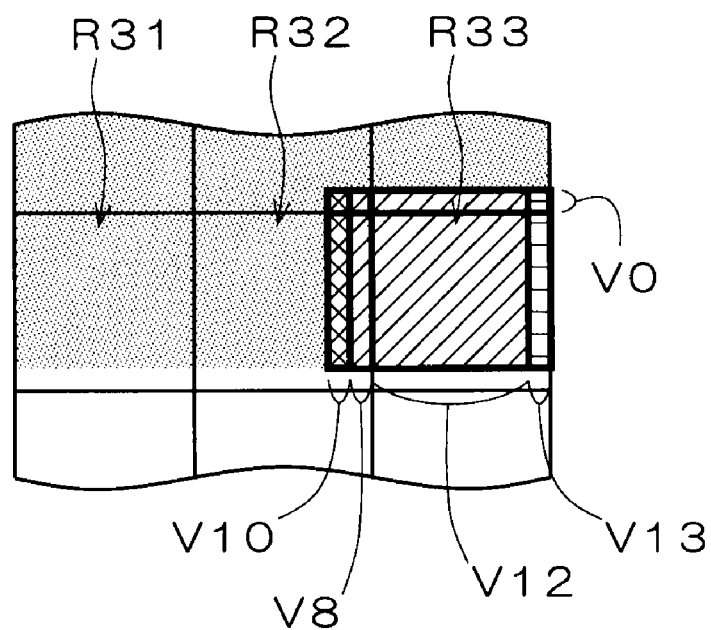
FIGS. 31A and 31B are diagrams illustrating how the image processor operates.
Figure 31B:
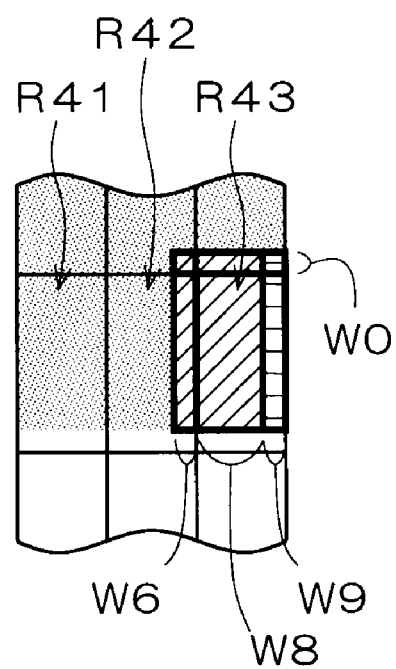

Referring next to FIG. 31B, the post-filter 72 performs postfiltering on the chrominance signals of the region W6 read from the memory unit 75 and the chrominance signals of a region W8. The region W8 consists of the top left 6 columns×14 rows in the region W7, and the 2 rows×6 columns in the region W0 abutting on the upper side thereof. The chrominance signals of a region W9, which is 16 rows×2 columns abutting on the right side of the region W8, are stored in the memory unit 75 without postfiltering by the post-filter 72 being performed at this time. The chrominance signals of the region of the bottom 2 rows in the region W7 are stored in the memory unit 76.

Figure 32A:
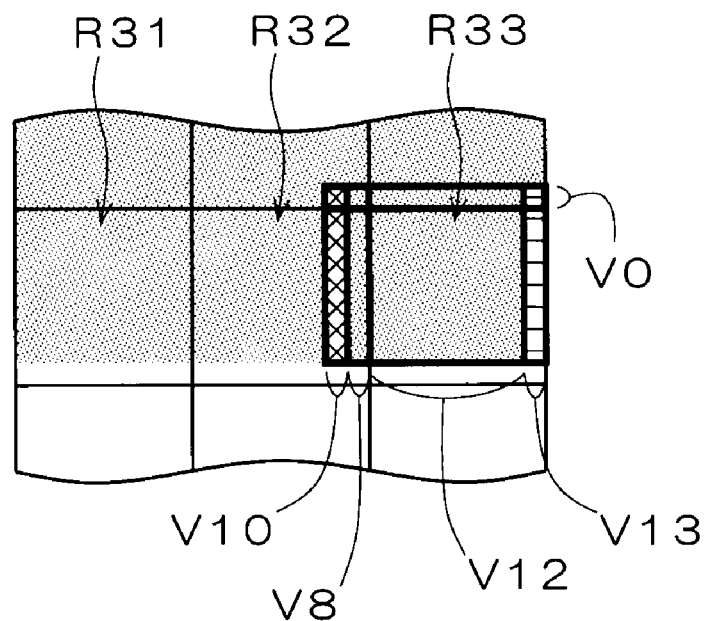
FIGS. 32A and 32B are diagrams illustrating how the image processor operates.
Figure 32B:
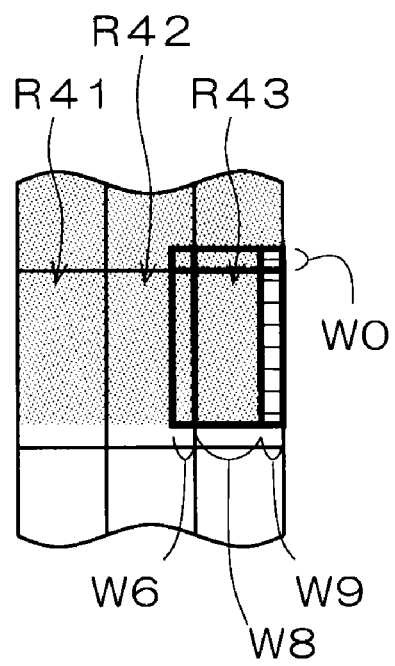

Referring next to FIG. 32A, the post-filter 62 performs postfiltering on the 16 in column×16 in row luminance signals of the regions V8 and V12, using a 4 rows×4 columns postfiltering element for sixteen times. The luminance signals after postfiltering are transmitted to the signal output unit 61. Referring to FIG. 32B, the post-filter 72 performs postfiltering on the 16 in column×8 in row chrominance signals of the regions W6 and W8, using a 4 rows×4 columns postfiltering element for eight times.

<Third Output Step from Image Processor 5>

Figure 33A:
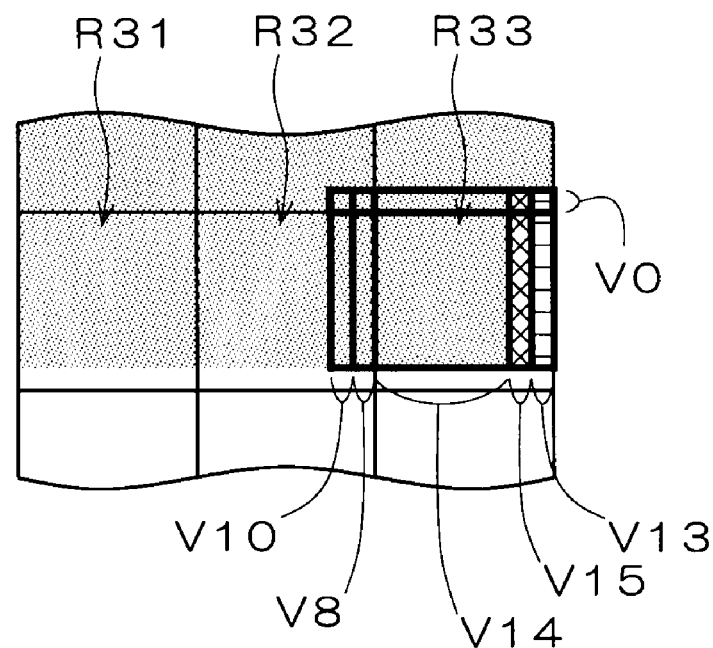
FIGS. 33A and 33B are diagrams illustrating how the image processor operates.
Figure 33B:
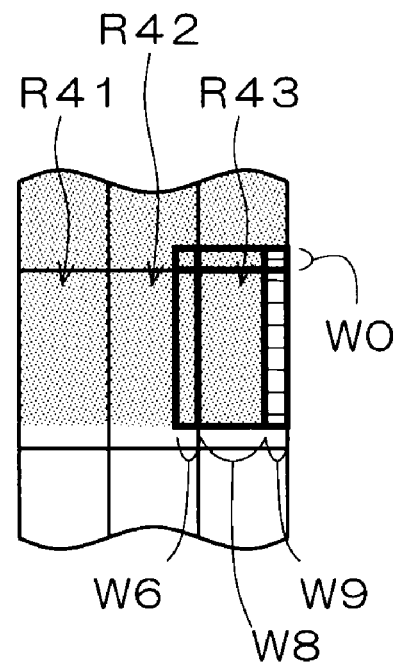

Referring next to FIG. 33A, the luminance signals after postfiltering of the region V10 read from the memory unit 64, the luminance signals after postfiltering of the region V8, and the luminance signals of a region V14, which is the left 12 columns in the region V12, are outputted from the signal output unit 61 to the external device subsequent to the image processor 5. The luminance signals after postfiltering of a region V15, which is the right 2 columns in the region V12, are not outputted to outside at this time but are stored in the memory unit 64. Referring to FIG. 33B, the chrominance signals after postfiltering of the regions W6 and W8 are outputted to the external device subsequent to the image processor 5. The regions V10, V8, and V14, and the regions W6 and W8 correspond to an identical pixel block (16 pixels in column×16 pixels in row) within the pixel plane.

Figure 34A:
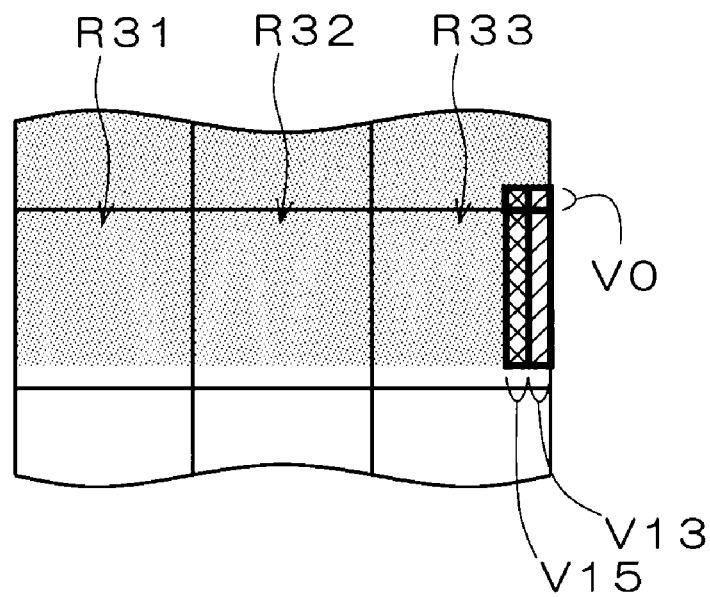
FIGS. 34A and 34B are diagrams illustrating how the image processor operates.
Figure 34B:
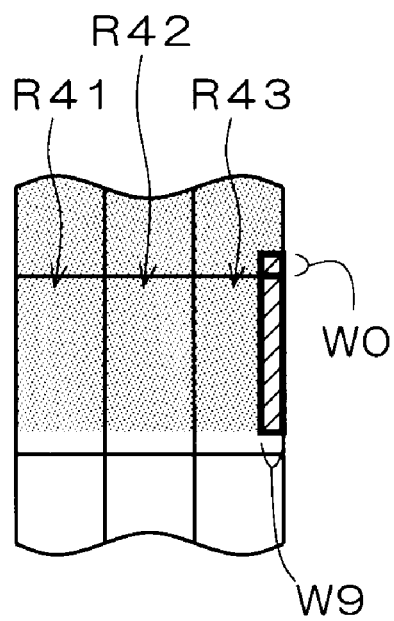

Referring next to FIG. 34A, the post-filter 62 performs postfiltering on the luminance signals of the region V13 read from the memory unit 65. Referring to FIG. 34B, the post-filter 72 performs postfiltering on the chrominance signals of the region W9 read from the memory unit 75.

Figure 35A:
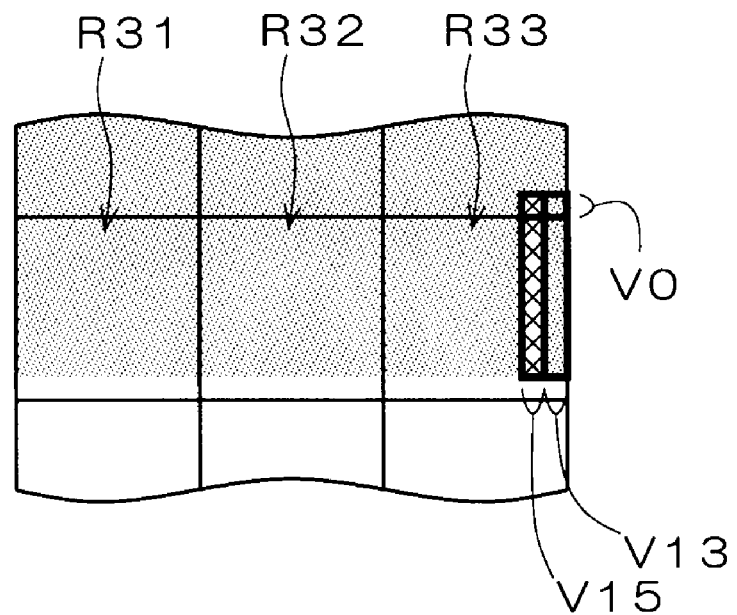
FIGS. 35A and 35B are diagrams illustrating how the image processor operates.
Figure 35B:
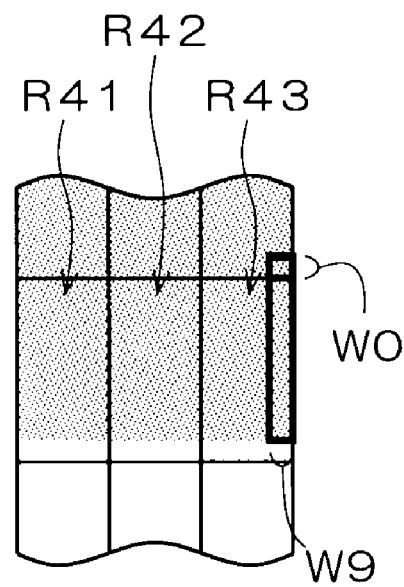

Referring next to FIG. 35A, the post-filter 62 performs postfiltering on the 16 in column×2 in row luminance signals of the region V13, using a 4 rows×2 columns postfiltering element for four times. The luminance signals after postfiltering are transmitted to the signal output unit 61. Referring to FIG. 35B, the post-filter 72 performs postfiltering on the 16 in column×2 in row chrominance signals of the region W9, using a 4 rows×2 columns postfiltering element for four times.

<Fourth Output Step from Image Processor 5>

Figure 36A:
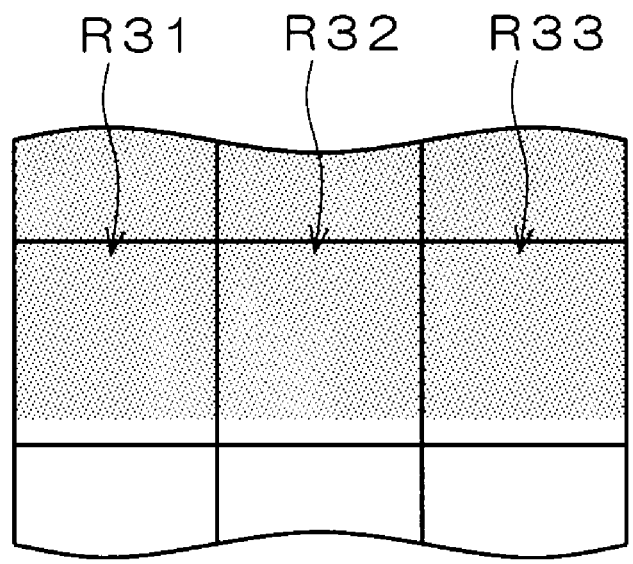
FIGS. 36A and 36B are diagrams illustrating how the image processor operates.
Figure 36B:
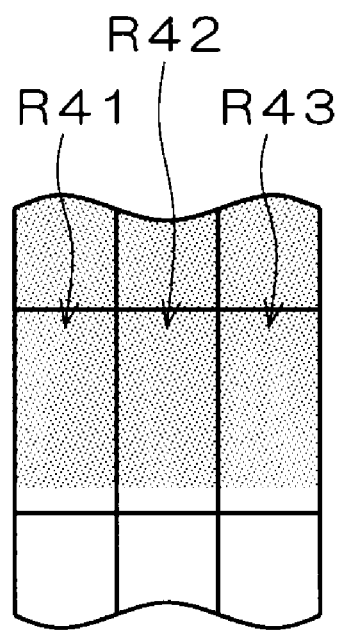

Referring next to FIG. 36A (and FIG. 35A), the luminance signals after postfiltering of the region V15 read from the memory unit 64 and the luminance signals after postfiltering of the region V13 are outputted from the signal output unit 61 to the external device subsequent to the image processor 5. Referring to FIG. 36B (and FIG. 35B), the chrominance signals after postfiltering of the regions W9 are outputted to the external device subsequent to the image processor 5. The regions V15 and V13, and the region W9 correspond to an identical pixel block (16 pixels in column×4 pixels in row) within the pixel plane.

<Summary>

In an image processor 5 according to the second preferred embodiment, in a first output step from the image processor 5 to outside, the signal output unit 61 outputs a first part (region V4) of first luminance signals (region V2) inputted from the post-filter 62, which is a part to be outputted to outside in the first output step, and stores a remaining second part (region V5) of the first luminance signals in the memory unit 64. In a second output step following the first output step, the signal output unit 61 outputs the second part (region V5) of the first luminance signals read from the memory unit 64 and a first part (regions V3 and V9) of second luminance signals (regions V3 and V7) inputted from the post-filter 62, which is a part to be outputted to outside in the second output step, and stores a remaining second part (region V10) of the second luminance signals in the memory unit 64. In a third and subsequent output steps, the same operations as the second output step are repeated.

Furthermore, as shown in FIG. 25, luminance signals (region V4) and chrominance signals (region W2) corresponding to a pixel block in an identical position within a pixel plane are concurrently outputted from the luminance signal processing unit 6 and the chrominance signal processing unit 7 in the first output step. Similarly, as shown in FIG. 29, luminance signals (regions V5, V3 and V9) and chrominance signals (region W3 and W5) corresponding to a pixel block in an identical position within a pixel plane are concurrently outputted from the luminance signal processing unit 6 and the chrominance signal processing unit 7 in the second output step. The same applies to the third and subsequent output steps.

Thus the image processor 5 according to the second preferred embodiment prevents difference in the position within a pixel plane between a pixel processed by the luminance signal processing unit 6 and a pixel processed by the chrominance signal processing unit 7, before the luminance and chrominance signals after postfiltering are outputted from the image processor 5.

While the invention has been described in detail, the foregoing description is in all aspects illustrative and not restrictive. It is understood that numerous other modifications and variations can be devised without departing from the scope of the invention.

What is claimed is:

1. An image processor comprising:
   a luminance signal processing unit processing a luminance signal; and
   a chrominance signal processing unit processing a chrominance signal,
   the image processor processing an image in which there are a smaller number of chrominance signals than luminance signals within a row of a pixel plane,
   the luminance signal processing unit including:
   a frequency transform unit performing frequency transform;
   a pre-filter performing prefiltering with a region which overlaps with plural unit regions for processing by the frequency transform unit as a unit region for processing, before frequency transform is performed; and
   a signal input unit receiving input of a luminance signal from outside the luminance signal processing unit and inputting a luminance signal to be processed by the pre-filter to the pre-filter,
   the signal input unit including a memory unit, wherein
   in a first input step from outside to the image processor, the signal input unit inputs to the pre-filter a first part of first luminance signals inputted from outside, the first part being a part to be processed by the pre-filter in the first input step, while storing a remaining second part of the first luminance signals in the memory unit, and
   in a second input step following the first input step, the signal input unit inputs to the pre-filter the second part of the first luminance signals read from the memory unit and a first part of second luminance signals inputted from outside, the first part being a part to be processed by the pre-filter in the second input step, while storing a remaining second part of the second luminance signals in the memory unit.

2. The image processor according to claim 1, wherein a luminance signal and a chrominance signal corresponding to an identical pixel are respectively inputted to the luminance signal processing unit and the chrominance signal processing unit in each input step.

3. An image processor comprising:
   a luminance signal processing unit processing a luminance signal; and
   a chrominance signal processing unit processing a chrominance signal,
   the image processor processing an image in which there are a smaller number of chrominance signals than luminance signals within a row of a pixel plane,
   the luminance signal processing unit including:
   a frequency inverse transform unit performing frequency inverse transform;
   a post-filter performing postfiltering with a region which overlaps with plural unit regions for processing by the frequency inverse transform unit as a unit region for processing, after frequency inverse transform is performed; and
   a signal output unit receiving input of a luminance signal processed by the post-filter from the post-filter and outputting a luminance signal to outside the luminance signal processing unit,
   the signal output unit including a memory unit, wherein
   in a first output step from the image processor to outside, the signal output unit outputs a first part of first luminance signals inputted from the post-filter, the first part being a part to be outputted to outside in the first output step, while storing a remaining second part of the first luminance signals in the memory unit, and
   in a second output step following the first output step, the signal output unit outputs the second part of the first luminance signals read from the memory unit and a first part of second luminance signals inputted from the post-filter, the first part being a part to be outputted to outside in the second output step, while storing a remaining second part of the second luminance signals in the memory unit.

4. The image processor according to claim 3, wherein a luminance signal and a chrominance signal corresponding to an identical pixel are respectively outputted from the luminance signal processing unit and the chrominance signal processing unit in each output step.

* * * * *